United States Patent
Liu et al.

(10) Patent No.: US 12,445,336 B1
(45) Date of Patent: Oct. 14, 2025

(54) MULTIPLE-PORT PHASE CHANGE ESTIMATION REFERENCE SIGNALS FOR DISCRETE FOURIER TRANSFORM-SPREAD ORTHOGONAL FREQUENCY-DIVISION MULTIPLEXING (DFT-S-OFDM) TRANSMISSIONS

(71) Applicant: QUALCOMM Incorporated, San Diego, CA (US)

(72) Inventors: Chih-Hao Liu, San Diego, CA (US); Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/780,149

(22) Filed: Jul. 22, 2024

(51) Int. Cl.
*H04L 12/43* (2006.01)
*H04L 27/26* (2006.01)

(52) U.S. Cl.
CPC ........ *H04L 27/26526* (2021.01); *H04L 12/43* (2013.01)

(58) Field of Classification Search
CPC  H04L 27/26526; H04L 27/2636; H04L 12/43
See application file for complete search history.

(56) References Cited

U.S. PATENT DOCUMENTS

2020/0076558 A1* 3/2020 Kuchi .................. H04L 5/0007

\* cited by examiner

*Primary Examiner* — Rahel Guarino
(74) *Attorney, Agent, or Firm* — Holland & Hart LLP

(57) ABSTRACT

Methods, systems, and devices for wireless communications are described. In some examples, a transmitting device associated with one or more non-coherent demodulation reference signal ports may transmit data including a phase change estimation reference signal with multiple reference signal groups. In some examples, multiple different phase change estimation reference signal ports may be code-division multiplexed to transmit the phase change estimation reference signal in the same set of reference signal groups using a different orthogonal cover code for each phase change estimation reference signal port. In some other examples, the different phase change estimation reference signal ports may be used for transmitting the phase change estimation reference signal in the different time-division multiplexed sets of reference signal groups. In such cases, by assigning two phase change estimation reference signal ports to two TDM sets, the two phase change estimation reference signal ports may be time-division multiplexed.

30 Claims, 11 Drawing Sheets

MULTIPLE-PORT PHASE CHANGE ESTIMATION REFERENCE SIGNALS FOR DISCRETE FOURIER TRANSFORM-SPREAD ORTHOGONAL FREQUENCY-DIVISION MULTIPLEXING (DFT-S-OFDM) TRANSMISSIONS

FIELD OF TECHNOLOGY

The following relates to wireless communications, including multiple-port phase change estimation reference signals for discrete Fourier transform-spread orthogonal frequency-division multiplexing (DFT-s-OFDM) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

Some wireless communications systems may support multiple-port phase change estimation reference signals (e.g., glue reference signals) for discrete Fourier transform-spread orthogonal frequency-division multiplexing (DFT-s-OFDM) transmissions. For example, the techniques described herein may include a wireless communication device multiplexing one or more phase change estimation reference signals with a set of data symbols in the time domain. The one or more phase change estimation reference signals may be associated with one or more sets of reference signal groups, and a set of multiple ports for transmitting the one or more phase change estimation reference signals may be associated with an orthogonal cover code and a first set of reference signal groups of the one or more sets of reference signal groups. In some examples, the set of multiple ports for transmitting the one or more phase change estimation reference signals may be associated with respective sets of reference signal groups of the one or more sets of reference signal groups, where the respective sets of reference signal groups corresponding to at least a first time-division multiplexing (TDM) set and a second TDM set different from the first TDM set. In any case, the wireless communication device may perform transform precoding on the set of data symbols and the one or more phase change estimation reference signals using a discrete Fourier transform (DFT), and the wireless communication device may transmit a message including the set of data symbols during two or more slots, where each slot of the two or more slots includes the set of data symbols, the one or more phase change estimation reference signals, and one or more demodulation reference signals. In some examples, at least one port of the set of multiple ports is used for transmitting the one or more phase change estimation reference signals, and the message may include a DFT-s-OFDM waveform based on the transform precoding.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
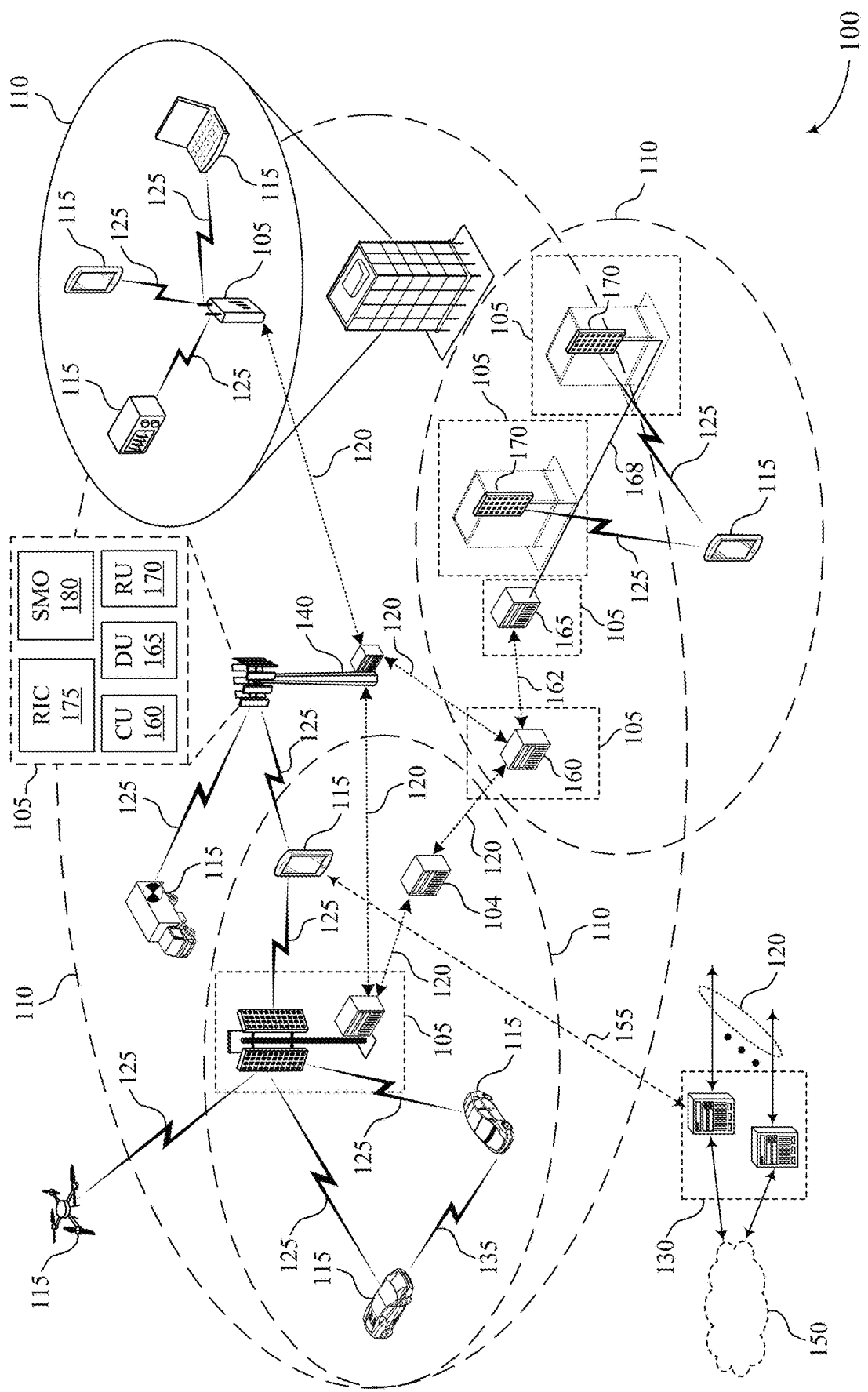
FIG. 1 shows an example of a wireless communications system that supports multiple-port phase change estimation reference signals for discrete Fourier transform-spread orthogonal frequency-division multiplexing (DFT-s-OFDM) transmissions in accordance with one or more aspects of the present disclosure.

In some wireless communications systems, data may be transmitted (e.g., via a physical uplink shared channel (PUSCH), via a physical downlink shared channel (PDSCH)) during multiple slots. In such cases, each slot may include a demodulation reference signal (DMRS) that is multiplexed with the data and used to aid a receiving device in decoding the data. In some cases, however, antenna ports associated with DMRS transmissions in each slot (e.g., DMRS ports) may lack coherence (e.g., phase coherence) between respective slots. In such cases, the receiving device may independently estimate the phase difference (e.g., phase jump) for each DMRS port, which may reduce decoding efficiency. As a result, a transmitting device may include an additional reference signal (e.g., a phase change estimation reference signal, which may be referred to as a glue reference signal (gRS), a gap-gluing reference signal, or the like) with the data transmission to assist the receiving device in determining the phase change between slots. In particular, the phase change estimation reference signal may be located near the end of a first slot and near the beginning of a second slot such that the receiving device may estimate the phase change across a slot boundary (e.g., a phase change boundary), as well as for joint channel estimation for the data transmission.

In some examples, the transmitting device may perform transform precoding on the phase change estimation reference signals to convert the time-domain phase change estimation reference signal into a discrete Fourier transform-spread orthogonal frequency-division multiplexing (DFT-s-OFDM) waveform. The transmitting device may use multiple antenna ports to transmit the phase change estimation reference signal in the presence of non-coherent DMRS ports. Accordingly, it may be useful to define techniques for including a multiple-port phase change estimation reference signal waveform for both coherent and non-coherent DMRS ports and for DFT-s-OFDM data transmissions.

Various aspects of the present disclosure are related to multiple-port phase change estimation reference signals for DFT-s-OFDM transmissions. In some examples, a transmitting device may transmit the phase change estimation reference signal with multiple reference signal groups in the time domain for a single transmitter/UE. For example, different phase change estimation reference signal ports may be code-division multiplexed (CDM) to transmit the phase change estimation reference signal in the same set of reference signal groups, where the transmitting device applies different time-division orthogonal cover codes (OCCs) (e.g., M different OCCs) for the different phase change estimation reference signal ports. Additionally, or alternatively, the multiple phase change estimation reference signal ports may be used for transmitting the phase change estimation reference signal in the different set of reference signal groups, where multiple sets of reference signal groups may be configured, and different sets of reference signal groups may be time-division multiplexed (TDM) in accordance with a timing offset. In such cases, by assigning multiple (e.g., two) phase change estimation reference signal ports to two TDM sets, the multiple ports may be TDMed. Such techniques may be used for DFT-s-OFDM transmissions when DMRS ports of the transmitting device are non-coherent.

In some aspects, such as when DMRS ports are coherent, if all the ports in a phase change estimation reference signal TDM set are from a same coherence group, the transmitting device may transmit a single port phase change estimation reference signal in the time domain, for example, with one resource element (e.g., time sample) per reference signal group per reference signal set. Further, some mapping rules may be defined such that a mapping between phase change estimation reference signal ports and DMRS ports is defined. For example, each DMRS coherence group may be configured with one or more phase change estimation reference signal ports, and control signaling may be used to indicate the mapping. Additionally, or alternatively, there may be a one-to-one mapping from DMRS CDM groups to sets of reference signal groups, and the DMRS ports in a CDM group may be mapped to the one or more phase change estimation reference signal ports in a set of reference signal groups.

Particular implementations of the subject matter described in this disclosure can be implemented to realize one or more of the following potential advantages. For example, in accordance with supporting the use of multiple ports for the transmission of phase change estimation reference signals for DFT-s-OFDM waveforms, improved bandwidth usage through increased orthogonality and the efficient estimation of phase changes between time intervals (e.g., between slots) may be achieved. In some examples, for transmissions using DFT-s-OFDM techniques (such as uplink transmissions), the inclusion of multi-port phase change estimation reference signals may enhance decoding efficiency by providing additional references signals in the DFT-s-OFDM waveform that may be used for phase jump estimation and/or channel estimation. Moreover, one or more of the mapping schemes described herein (e.g., mapping phase change reference signals to DMRS ports and/or DMRS coherence groups) may improve signaling efficiency by avoiding excess control signing to indicating the mapping, thereby reducing complexity in the system. Accordingly, the described techniques may enable UEs and network entities to achieve relatively higher data rates, greater spectral efficiency, and facilitate greater system capacity, among other benefits.

Aspects of the disclosure are initially described in the context of wireless communications systems. Aspects of the disclosure are additionally described with reference to signaling diagrams and process flows. Aspects of the disclosure are further illustrated by and described with reference to apparatus diagrams, system diagrams, and flowcharts that relate to multiple-port phase change estimation reference signals for DFT-s-OFDM transmissions.

FIG. 1 shows an example of a wireless communications system 100 that supports multiple-port phase change estimation reference signals for DFT-s-OFDM transmissions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Wireless communication devices (e.g., one or more UEs 115, one or more network entities 105) in the wireless communications system 100 may support the transmission of one or more phase change estimation reference signals (e.g., gRSs) using multiple ports and using a DFT-s-OFDM waveform. In some examples, a transmitting device (e.g., a UE 115, a network entity 105) may transmit data including the phase change estimation reference signals within multiple reference signal groups in the time domain. The transmitting device may transmit signaling over multiple time intervals (e.g., over multiple consecutive slots) that is associated with one or more non-coherent DMRS ports. In some aspects, multiple different phase change estimation reference signal ports may be CDMed to transmit the phase change estimation reference signal in the same set of reference signal groups, where the transmitting device applies a different OCC for each phase change estimation reference signal port. That is, different phase change estimation reference signal ports may be used for transmitting a pre-DFT phase change estimation reference signal (e.g., a pre-DFT gRS, a phase change estimation reference signal that is multiplexed in a set of data symbols prior to transform precoding) that is associated with a same set of phase change estimation reference signal groups, where a different time domain- and/or frequency domain-OCC may be applied to the phase change estimation reference signal for transmission. Additionally, or alternatively, the different phase change estimation reference signal ports may be used for transmitting the phase change estimation reference signal in the different set of reference signal groups, with different sets of reference signal groups being TDMed in accordance with a timing offset. In such cases, by assigning two phase change estimation reference signal ports to two TDM sets, the two ports may be TDMed.

In cases where the DMRS ports are coherent (e.g., if all the ports in a phase change estimation reference signal TDM set are from a same coherence group), the transmitting device may transmit a single port phase change estimation reference signal in the time domain with one resource element (e.g., time samples) per reference signal group per reference signal set. Further, some mapping rules may be defined such that a mapping between the phase change estimation reference signal ports and the DMRS ports is defined. For example, each DMRS coherence group may be configured with one or more phase change estimation reference signal ports, and control signaling may be used to indicate which the mapping. Additionally, or alternatively, there may be a one-to-one mapping between DMRS CDM groups and sets of reference signal groups. In some cases, the DMRS ports in a CDM group may be mapped to the one or more phase change estimation reference signal ports in a set of reference signal groups.

Figure 2:
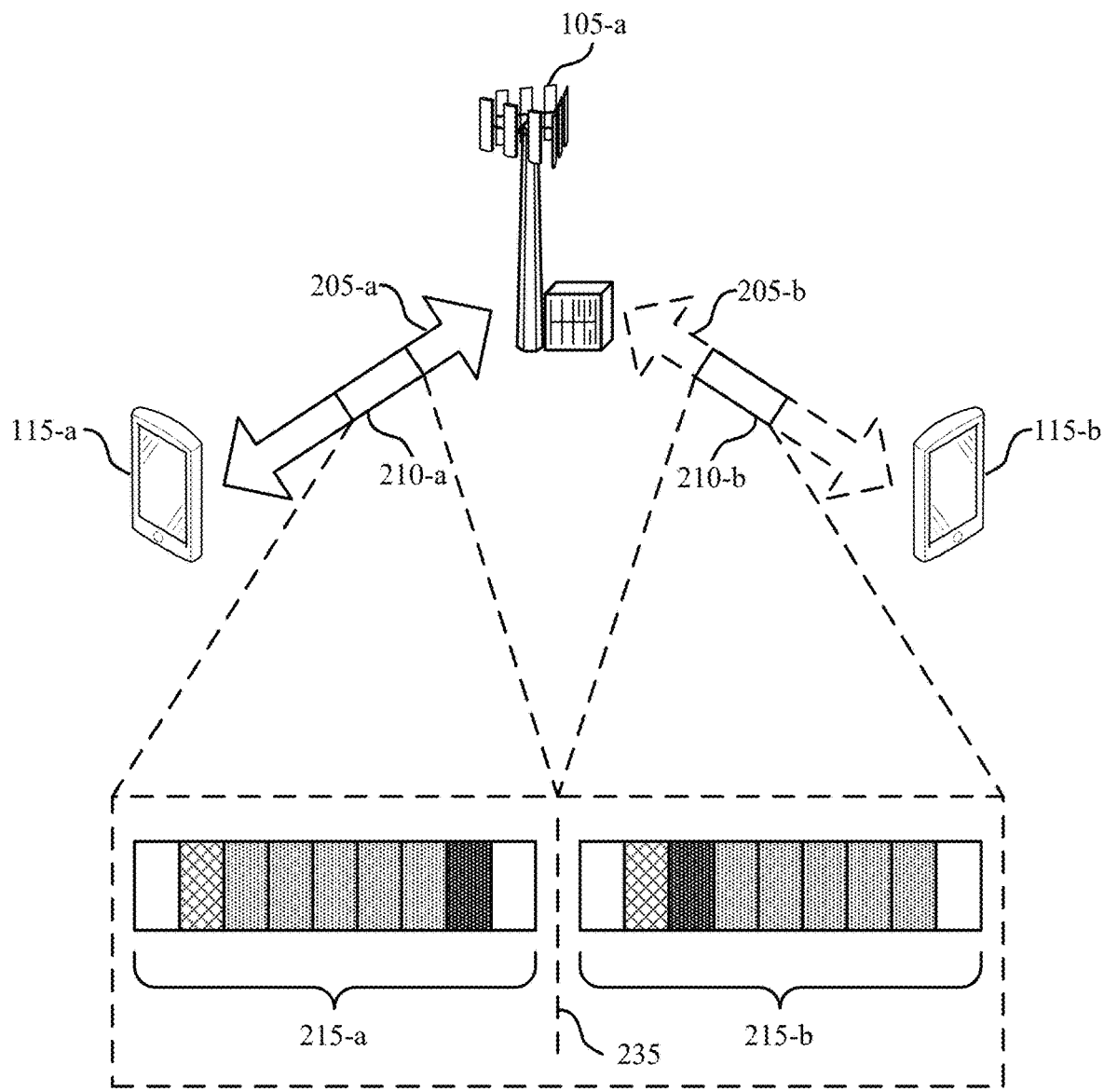
FIG. 2 shows an example of a wireless communications system that supports multiple-port phase change estimation reference signals for DFT-s-OFDM transmissions in accordance with one or more aspects of the present disclosure.

FIG. 2 shows an example of a wireless communications system 200 that supports multiple-port phase change estimation reference signals for DFT-s-OFDM transmissions in accordance with one or more aspects of the present disclosure. The wireless communications system 200 may include a network entity 105-a in communications with a first UE 115-a and a second UE 115-b, each of which may be examples of corresponding devices described herein, including with reference to FIG. 1. Each UE 115 may communicate with the network entity 105-a via a respective communication link 205. For example, the first UE 115-a may communicate with the network entity 105-a via a first communication link 205-a, and the second UE 115-b may communicate with the network entity 105-a via a second communication link 205-b. The communication links 205 may include uplink communications, downlink communications, or both.

In some examples, the wireless communications system 200 may be a SU-MIMO system as described with reference to FIG. 1. In a SU-MIMO system, the network entity 105-a may communicate with a UE 115, such as the first UE 115-a or the second UE 115-b. In the example of FIG. 2, for a SU-MIMO system, the first UE 115-a may transmit a first message 210-a to the network entity 105-a. In some other examples, the wireless communications system 200 may be a MU-MIMO system as described with reference to FIG. 1. In a MU-MIMO system, the network entity 105-a may communicate with both the first UE 115-a and the second UE 115-b. In such cases, the UEs 115 may multiplex transmissions over a wireless channel. For example, the UEs 115 may implement TDM, FDM, CDM, or any combination thereof, to simultaneously communicate with the network entity 105-a. In the example of FIG. 2, for a MU-MIMO system, the first UE 115-a may transmit the first message 210-a to the network entity 105-a, and the second UE 115-b may transmit a second message 210-b to the network entity 105-a.

In some examples, the first message 210-a and the second message 210-b may be precoded before transmission to the network entity 105-a. The first UE 115-a and the second UE 115-b may support transform precoding techniques to improve orthogonality of the first message 210-a and the second message 210-b and to reduce interference at the network entity 105-a. The transform precoding may convert the first message 210-a and the second message 210-b from a frequency-domain signal to a time-domain signal. In some examples, the first UE 115-a and the second UE 115-b may perform transform precoding using a discrete Fourier transform to convert the first message 210-a and the second message 210-b into DFT-s-OFDM waveforms.

Devices within the wireless communications system 200 may perform channel estimation procedures to establish communication and communicate signaling. In an example, the UEs 115 and the network entity 105-a may communicate one or more reference signals for performing channel estimation. For example, the first UE 115-a may include the one or more reference signals in the first message 210-a, and similarly, the second UE 115-b may include the one or more reference signals in the second message 210-b. In some cases, the UEs 115 and the network entity 105-a may communicate the one or more reference signals in bursts. For example, the first UE 115-a may transmit the first message 210-a to the network entity 105-a via multiple slots 215, such as a first slot 215-a and a second slot 215-b. In the example of FIG. 2, the first message 210-a may include a guard tone 220 at a starting position of a slot 215 (e.g., the first slot 215-a, the second slot 215-b), one or more DMRS 225, one or more data symbols 230, and a guard tone 220 in a terminal position of the slot 215 (e.g., the first slot 215-a, the second slot 215-b).

In some cases, there may be a discontinuity across a phase jump boundary 235 (e.g., a slot boundary) between the first slot 215-a and the second slot 215-b. For example, a phase of the first message 210-a may change (e.g., jump) between the first slot 215-a and the second slot 215-b. To estimate the phase change across the phase jump boundary 235 for the first message 210-a, the first UE 115-a may include one or more phase change estimation reference signals 240 (e.g., a glue reference signal) in the first message 210-a. That is, a phase change estimation reference signal 240 may be a reference signal used to provide additional information to a receiving device for determining a phase difference between slot boundaries, for example, when a message is transmitted across multiple slots. For example, the first message 210-a may include multiple phase change estimation reference signals 240, including one before the phase jump boundary 235 and one after the phase jump boundary 235. The first UE 115-a may multiplex the phase change estimation reference signals 240 with one or more data symbols 230 of the first message 210-a to reduce signaling overhead for the phase change estimation reference signals 240.

The UEs 115 may communicate the one or more reference signals (e.g., the DMRS 225, the phase change estimation reference signals 240) with the network entity 105-a via one or more respective antenna ports (e.g., DMRS ports, phase change estimation reference signal ports) of the UEs 115. In some cases, a UE 115 (e.g., the first UE 115-a) may include one or more coherent DMRS ports. Coherent DMRS ports may be driven by a same clock, and phase changes for each of the coherent DMRS ports may be the same. In some other cases, the first UE 115-a may be configured with multiple non-coherent DMRS ports. As an example, non-coherent DMRS ports may be driven by different clocks (e.g., associated with respective transmit chains or other components) and may drift apart in frequency over time. Accordingly, phase changes for each of the non-coherent DMRS ports may be different, and a receiving device (e.g., the network entity 105-*a*) may independently estimate the phase change for each DMRS port using a respective phase change estimation reference signal 240.

Each phase change estimation reference signal 240 may also be transmitted via one or more respective antenna ports (e.g., phase change estimation reference signal port) of the first UE 115-*a*. In some cases, the phase change estimation reference signal 240 may be structured or configured such that a density of resource signaling included in the phase change estimation reference signal 240 is relatively less than the density of resource signaling associated with the DMRS 225. Because the network entity 105-*a* may use the phase change estimation reference signals 240 for phase change estimation and/or channel estimation, the UEs 115 may limit the information included in the phase change estimation reference signals 240 to reduce signaling overhead for the phase change estimation reference signals 240.

If the DMRS ports for transmitting the first message 210-*a* are non-coherent, the phase change estimation reference signal ports for transmitting the first message 210-*a* may be grouped into one or more sets of reference signal groups (e.g., where each set includes one or more groups of phase change estimation reference signals). In an example, a first set of reference signal groups may include a first phase change estimation reference signal port (e.g., port0) of the first UE 115-*a* and a second phase change estimation reference signal port (e.g., port1) of the first UE 115-*a*. Alternatively, the first set of reference signal groups may include a first phase change estimation reference signal port of the first UE 115-*a* and a second phase change estimation reference signal port of the second UE 115-*b*. The first set of reference signal groups may be associated with an OCC to support CDM of the phase change estimation reference signals 240. For example, the first UE 115-*a* may apply the OCC to the phase change estimation reference signals 240 such that a first value of the OCC indicates the first phase change estimation reference signal port and that a second value of the OCC indicates the second phase change estimation reference signal port. The OCC may be a time-domain (TD) OCC or a frequency-domain (FD) OCC.

In another example, the first set of reference signal groups may include a first phase change estimation reference signal port from the first UE 115-*a* and a second phase change estimation reference signal port from the first UE 115-*a*, and the second set of reference signal groups may include a third phase change estimation reference signal port from the first UE 115-*a* and a fourth phase change estimation reference signal port from the first UE 115-*a*. Alternatively, the first set of reference signal groups may include the first phase change estimation reference signal port from the first UE 115-*a* and the second phase change estimation reference signal port from the first UE 115-*a*, and the second set of reference signal groups may include a third phase change estimation reference signal port from the second UE 115-*b* and a fourth phase change estimation reference signal port from the second UE 115-*b*.

In cases where the network entity 105-*a* identifies multiple sets of reference signal groups (e.g., the first set of reference signal groups and the second set of reference signal groups), each set of reference signal groups may be associated with a TDM set. For example, the first set of reference signal groups may correspond to a first TDM set, and the second set of reference signal groups may correspond to a second TDM set. Each TDM set may be assigned a phase change estimation reference signal port for transmitting phase change estimation reference signals 240 for the corresponding set of reference signal groups. For example, the first TDM set may be assigned a first phase change estimation reference signal port and the second TDM set may be assigned a second phase change estimation reference signal port.

In cases where the DMRS ports for transmitting the first message 210-*a* are coherent, the network entity 105-*a* may map the DMRS ports to the phase change estimation reference signal ports. For example, the network entity 105-*a* may identify one or more coherence port groups based on coherent DMRS ports or coherent phase change estimation reference signal ports. In some examples, each coherence port group may indicate a relationship between DMRS ports and phase change estimation reference signal ports. For example, the coherence port group may indicate a one-to-one mapping between DMRS ports and phase change estimation reference signal ports. For each coherence port group, the network entity 105-*a* may select a phase change estimation reference signal port for transmitting phase change estimation reference signals 240 and may map the DMRS ports of the coherence port group to the selected phase change estimation reference signal port. Consolidating coherent ports in accordance with a mapping between DMRS ports and phase change estimation reference signal ports may reduce signaling overhead for the phase change estimation reference signals 240.

In some implementations (e.g., where the first message 210-*a* is a DFT-s-OFDM waveform), the DMRS 225 may not share a structure (e.g., waveform structure) with the phase change estimation reference signals 240 before performing transform precoding. For example, the phase change estimation reference signal 240 before transform precoding may be a TDM waveform, while the DMRS 225 may be an FDM waveform. Accordingly, the network entity 105-*a* may estimate the phase change using multiple phase change estimation reference signals 240 transmitted on either side of the phase change boundary and may not use the DMRS 225 to estimate the phase change. In such cases, the In some examples, the UEs 115 may report capability information to the network entity 105-*a*. The capability information may indicate which DMRS ports of a UE 115 are coherent. Based on the capability information, the network entity 105-*a* may form (e.g., identify) one or more DMRS coherence groups. The network entity 105-*a* may configure each DMRS coherence group with one or more phase change estimation reference signal ports. For each coherence group, the network entity 105-*a* may transmit downlink control information (DCI) indicating a mapping between the phase change estimation reference signal ports and the DMRS ports. In some cases, the DCI may include a field for each phase change estimation reference signal port indicating which DMRS ports of a DMRS coherence group the phase change estimation reference signal port maps to.

Alternatively, to simplify the mapping and reduce association signaling included in the DCI, the network entity 105-*a* may determine a mapping between the DMRS ports and the phase change estimation reference signal ports. For example, the network entity 105-*a* may determine a one-to-one mapping between one or more DMRS CDM groups and one or more sets of reference signal groups (e.g., one or more sets of phase change estimation reference signal groups). The network entity 105-a may also determine a one-to-one mapping between the DMRS ports of a DMRS CDM group and the phase change estimation reference signal ports of a corresponding phase change estimation reference signal group. In some examples, the phase change estimation reference signal ports of a same set of phase change estimation reference signal groups may also be CDMed. Accordingly, a size of the OCC applied to the phase change estimation reference signal group may be the same as a size of a second OCC applied to a DMRS CDM group. DMRS ports and phase change estimation reference signal ports within a same CDM group may share a one-to-one mapping. Similarly, two DMRS ports from two different CDM groups may map to two phase change estimation reference signal ports from two different sets of phase change estimation reference signal groups. The UEs 115 may determine to transmit signaling via a phase change estimation reference signal port if signaling is transmitted via a corresponding DMRS port.

Figure 3:
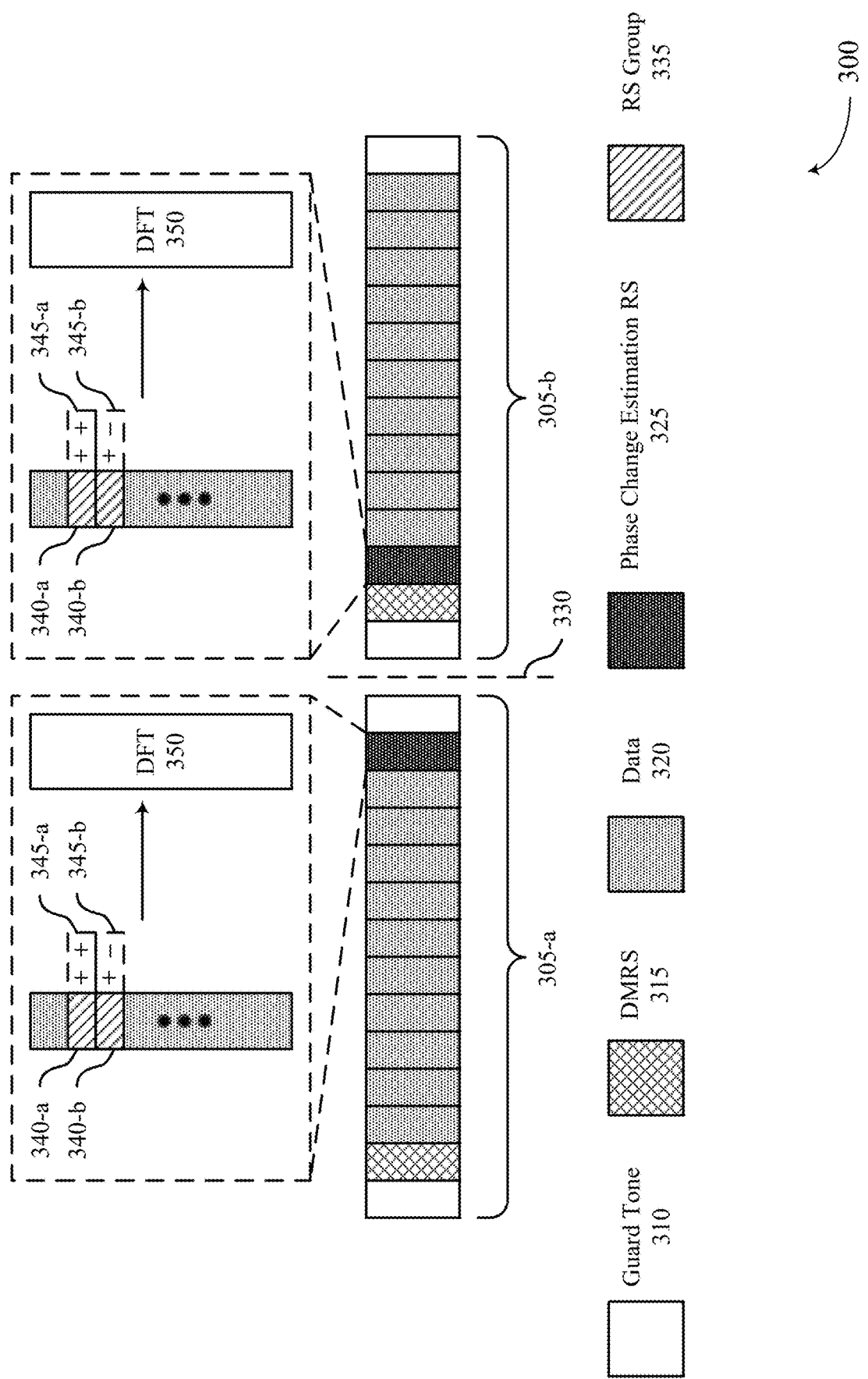
FIG. 3 shows an example of a signaling diagram that supports multiple-port phase change estimation reference signals for DFT-s-OFDM transmissions in accordance with one or more aspects of the present disclosure.

FIG. 3 shows an example of a signaling diagram 300 that supports multiple-port phase change estimation reference signals for DFT-s-OFDM transmissions in accordance with one or more aspects of the present disclosure. The signaling diagram 300 may illustrate communications between a first UE (not shown), a second UE (not shown), and a network entity (not shown). In some examples, the first UE and the second UE may communicate one or more reference signals with the network entity for channel estimation, which may be examples of corresponding devices and features described herein, including with reference to FIGS. 1 and 2. In the example of FIG. 3, the first UE, the second UE, or both, may be a transmitting device, and the network entity may be a receiving device. In some other examples, the first UE, the second UE, or both, may be the receiving device, and the network entity may be the transmitting device.

As described with reference to FIG. 2, the UEs (e.g., the first UE, the second UE, or both) and the network entity may communicate reference signals for channel estimation via multiple antenna ports. For example, the UEs may transmit a message (e.g., a first message 210-a, a second message 210-b) to the network entity over at least a first slot 305-a and a second slot 305-b. Each slot 305 may include a guard tone 310 at a starting position of the slot 305, one or more DMRSs 315, one or more data symbols 320, one or more phase change estimation reference signals 325, and a guard tone 310 in a terminal position of the slot 305. The UEs may transmit the DMRS 315 via one or more DMRS ports and may transmit the phase change estimation reference signals 325 via one or more phase change estimation reference signal ports.

In some cases, the DMRS ports may be non-coherent, and the network entity may estimate a phase change over a phase change boundary 330 using the phase change estimation reference signals 325 in both the first slot 305-a and the second slot 305-b to receive the message from the UEs. In some examples, prior to performing transform precoding on the phase change estimation reference signals 325, the UEs may multiplex the phase change estimation reference signals 325 with one or more data symbols 320 such that the phase change estimation reference signal 325 in the first slot 305-a and the phase change estimation reference signal 325 in the second slot 305-b are close to the phase change boundary 330 so the UEs can perform phase change estimation.

If the DMRS ports for transmitting the DMRS 315 are non-coherent, the phase change estimation reference signal ports for transmitting the phase change estimation reference signals 325 may be grouped into one or more sets of reference signal groups. Each RS group 335 may include a quantity M resource elements 340 (e.g., a first resource element 340-a, a second resource element 340-b) corresponding to the quantity of phase change estimation reference signal ports configured for transmitting the phase change estimation reference signals 325. In an example, an RS group 335 may include a first phase change estimation reference signal port of the first UE and a second phase change estimation reference signal port of the first UE. Alternatively, the RS group 335 may include a first phase change estimation reference signal port of the first UE and a second phase change estimation reference signal port of the second UE. In some examples, the phase change estimation reference signal ports within a same set of reference signal groups (e.g., an RS group 335) may share resources and may be configured with a same phase change estimation reference signal sequence. However, each phase change estimation reference signal port may be associated with different OCCs 345. The RS group 335 may be associated with one or more OCCs 345 to support CDM of the phase change estimation reference signals 325. In some examples, the first UE may apply a first OCC 345-a to the first phase change estimation reference signal port and may apply a second OCC 345-b to the second phase change estimation reference signal port. The OCC 345 may be a TD OCC or an FD OCC. In some examples, the phase change estimation reference signals 325 may be precoded before transmission to the network entity. For example, after applying the first OCC 345-a and the second OCC 345-b, the UEs may perform transform precoding using a DFT 350 to convert the message into a DFT-s-OFDM waveform.

Figure 4:
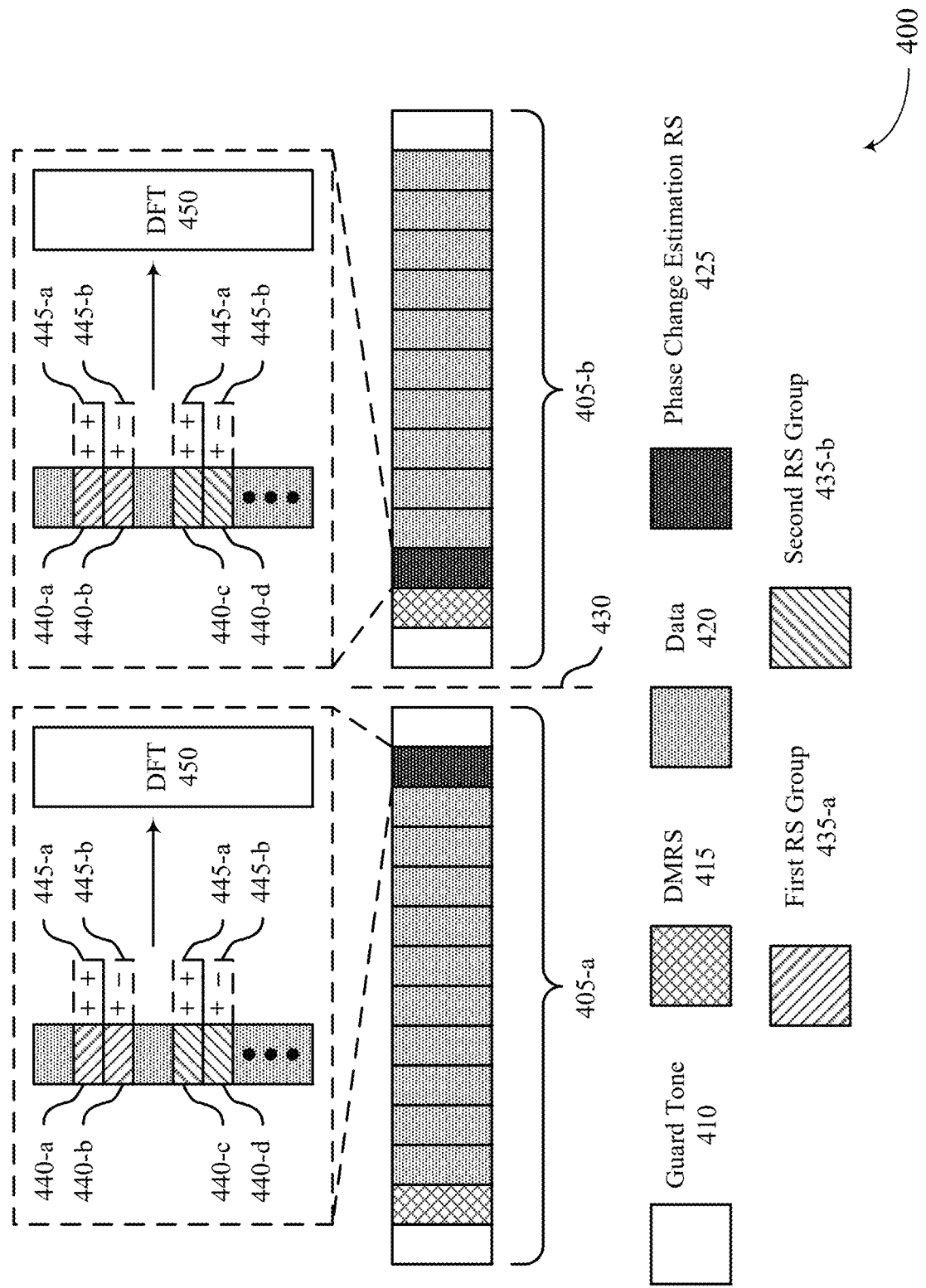
FIG. 4 shows an example of a signaling diagram that supports multiple-port phase change estimation reference signals for DFT-s-OFDM transmissions in accordance with one or more aspects of the present disclosure.

FIG. 4 shows an example of a signaling diagram 400 that supports multiple-port phase change estimation reference signals for DFT-s-OFDM transmissions in accordance with one or more aspects of the present disclosure. The signaling diagram 400 may illustrate communications between a first UE (not shown), a second UE (not shown), and a network entity (not shown). In some examples, the first UE and the second UE may communicate one or more reference signals with the network entity for channel estimation, which may be examples of corresponding devices and features described herein, including with reference to FIGS. 1 and 2. In the example of FIG. 4, the first UE, the second UE, or both, may be a transmitting device, and the network entity may be a receiving device. In some other examples, the first UE, the second UE, or both, may be the receiving device, and the network entity may be the transmitting device.

As described with reference to FIG. 2, the UEs (e.g., the first UE, the second UE, or both) and the network entity may communicate reference signals for channel estimation via multiple antenna ports. For example, the UEs may transmit a message (e.g., a first message 210-a, a second message 210-b) to the network entity over at least a first slot 405-a and a second slot 405-b. Each slot 405 may include a guard tone 410 at a starting position of the slot 405, one or more DMRSs 415, one or more data symbols 420, one or more phase change estimation reference signals 425, and a guard tone 410 in a terminal position of the slot 405. The UEs may transmit the DMRS 415 via one or more DMRS ports and may transmit the phase change estimation reference signals 425 via one or more phase change estimation reference signal ports.

In some cases, the DMRS ports may be non-coherent, and the network entity may estimate a phase change over a phase change boundary 430 using the phase change estimation reference signals 425 in both the first slot 405-a and the second slot 405-b to receive the message from the UEs. In some examples, prior to performing transform precoding on the phase change estimation reference signals 425, the UEs may multiplex the phase change estimation reference signals 425 with one or more data symbols 420 such that the phase change estimation reference signal 425 in the first slot 405-*a* and the phase change estimation reference signal 425 in the second slot 405-*b* are close to the phase change boundary 430 so the UEs can perform phase change estimation.

If the DMRS ports for transmitting the DMRS 415 are non-coherent, the phase change estimation reference signal ports for transmitting the phase change estimation reference signals 425 may be grouped into one or more sets of reference signal groups (e.g., an RS group 435), including a first RS group 435-*a* and a second RS group 435-*b*. Each RS group may include a quantity M resource elements 440 corresponding to the quantity of phase change estimation reference signal ports configured for transmitting the phase change estimation reference signals 425. In an example, the first RS group 435 may include a first phase change estimation reference signal port from the first UE and a second phase change estimation reference signal port from the first UE, and the second RS group 435-*b* may include a third phase change estimation reference signal port from the first UE and a fourth phase change estimation reference signal port from the first UE. Alternatively, the first RS group 435-*a* may include the first phase change estimation reference signal port from the first UE and the second phase change estimation reference signal port from the first UE, and the second RS group 435-*b* may include a third phase change estimation reference signal port from the second UE and a fourth phase change estimation reference signal port from the second UE. In the example of FIG. 4, the first RS group 435-*a* may include a first resource element 440-*a* and a second resource element 440-*b*, and the second RS group 435-*b* may include a third resource element 440-*c* and a fourth resource element 440-*d*.

In cases where the network entity 105-*a* identifies multiple RS groups 435, each RS group 435 may be associated with a TDM set. For example, the first RS group 435-*a* may correspond to a first TDM set, and the second RS group 435-*b* may correspond to a second TDM set. The first TDM set and the second TDM set may be separated by a timing offset, where the timing offset is greater than or equal to the quantity of resource elements in each RS group 435. Each TDM set may be assigned a phase change estimation reference signal port for transmitting phase change estimation reference signals 240 for the corresponding set of reference signal groups. For example, the first TDM set may be assigned a first phase change estimation reference signal port and the second TDM set may be assigned a second phase change estimation reference signal port. By assigning a phase change estimation reference signal port to each TDM set, the assigned phase change estimation reference signal ports may be TDMed.

Additionally, the UEs and the network entity may also implement CDM within an RS group 435. As described herein with reference to FIG. 3, each phase change estimation reference signal port within an RS group 435 may be associated with a different OCC 445. However, the UEs and the network entity may apply the same OCCs 445 to each RS group 435. In some examples, the UEs may apply a first OCC 445-*a* to the first phase change estimation reference signal port of the first RS group 435-*a* and may apply a second OCC 445-*b* to the second phase change estimation reference signal port of the first RS group 435-*a*. Additionally, the UEs may apply the first OCC 445-*a* to the third phase change estimation reference signal port of the second RS group 435-*a* and may apply the second OCC 445-*b* to the fourth phase change estimation reference signal port of the second RS group 435-*b*. The OCC 445 may be a TD OCC or an FD OCC.

In some examples, the phase change estimation reference signals 425 may be precoded before transmission to the network entity. For example, after applying the first OCC 445-*a* and the second OCC 445-*b* to the first RS group 435-*a* and the second RS group 435-*b*, the UEs may perform transform precoding using a DFT 450 to convert the message into a DFT-s-OFDM waveform.

Figure 5:
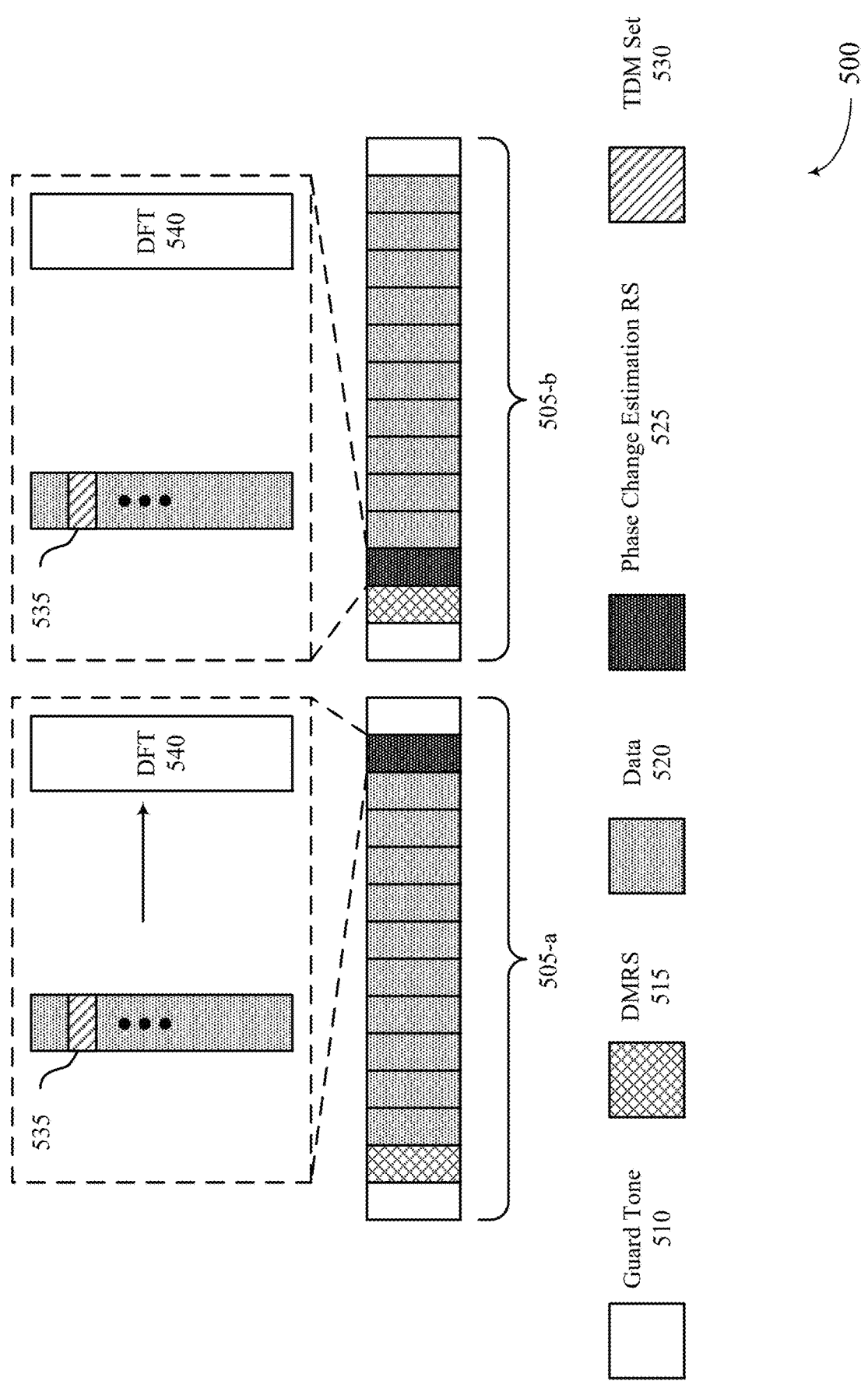
FIG. 5 shows an example of a signaling diagram that supports multiple-port phase change estimation reference signals for DFT-s-OFDM transmissions in accordance with one or more aspects of the present disclosure.

FIG. 5 shows an example of a signaling diagram 500 that supports multiple-port phase change estimation reference signals for DFT-s-OFDM transmissions in accordance with one or more aspects of the present disclosure. The signaling diagram 500 may illustrate communications between a first UE (not shown), a second UE (not shown), and a network entity (not shown). In some examples, the first UE and the second UE may communicate one or more reference signals with the network entity for channel estimation, which may be examples of corresponding devices and features described herein, including with reference to FIGS. 1 and 2. In the example of FIG. 5, the first UE, the second UE, or both, may be a transmitting device, and the network entity may be a receiving device. In some other examples, the first UE, the second UE, or both, may be the receiving device, and the network entity may be the transmitting device.

As described with reference to FIG. 2, the UEs (e.g., the first UE, the second UE, or both) and the network entity may communicate reference signals for channel estimation via multiple antenna ports. For example, the UEs may transmit a message (e.g., a first message 210-*a*, a second message 210-*b*) to the network entity over at least a first slot 505-*a* and a second slot 505-*b*. Each slot 505 may include a guard tone 510 at a starting position of the slot 505, one or more DMRSs 515, one or more data symbols 520, one or more phase change estimation reference signals 525, and a guard tone 510 in a terminal position of the slot 505. The UEs may transmit the DMRS 515 via one or more DMRS ports and may transmit the phase change estimation reference signals 525 via one or more phase change estimation reference signal ports. In some examples, prior to performing transform precoding on the phase change estimation reference signals 525, the UEs may multiplex the phase change estimation reference signals 525 with one or more data symbols 520.

In some cases, the DMRS ports for transmitting the DMRS 515 may be coherent. If the DMRS ports are coherent, the network entity may map the DMRS ports to the phase change estimation reference signal ports. For example, the network entity may identify one or more coherence port groups (e.g., coherence groups) based on coherent DMRS ports or coherent phase change estimation reference signal ports, where each port (e.g., DMRS port, phase change estimation reference signal port) within a coherence port group is coherent with the other ports of the coherence port group. In some examples, each coherence port group may indicate a relationship between the DMRS ports and the phase change estimation reference signal ports. For example, the coherence port group may indicate a one-to-one mapping between DMRS ports and phase change estimation reference signal ports. In some examples, the UEs may report capability information to the network entity, and the network entity may indicate the mapping to the UEs. In some cases, the mapping may be explicitly indicated. For example, the network entity may transmit a DCI indicating that a quantity of ports are coherent. In some other cases, the mapping may be implicitly indicated. For example, the network entity may indicate a first (e.g., starting) port index and a second (e.g., last) port index, which may indicate a range of coherent ports to the UEs.

In some examples, for each coherence port group, the network entity may select a designated phase change estimation reference signal port for transmitting phase change estimation reference signals 525 in the time domain. Additionally, the network entity may select one resource element 535 to transmit the phase change estimation reference signals 525 in the time domain. The network entity may select the phase change estimation reference signal port prior to performing transform precoding. The network entity may map (e.g., remap) the DMRS ports of the coherence port group to the selected phase change estimation reference signal port. Consolidating coherent ports in accordance with a mapping between DMRS ports and phase change estimation reference signal ports may reduce signaling overhead for the phase change estimation reference signals 525.

If, for a set of reference signal groups (e.g., the TDM set 530), the network entity determines that the ports of the TDM set are coherent (e.g., if all ports in a TDM set 530 are from a same coherence group), the network entity may configure the message to further reduce overhead of the phase change estimation reference signals 525. For example, the network entity may select a single resource element 535 for transmitting the phase change estimation reference signal 525. The UEs may transmit the phase change estimation reference signal 525 in one of the DMRS ports in a CDM group. In some examples, the phase change estimation reference signals 525 may be precoded before transmission to the network entity. For example, the UEs may perform transform precoding using a DFT 540 to convert the message into a DFT-s-OFDM waveform.

Figure 6:
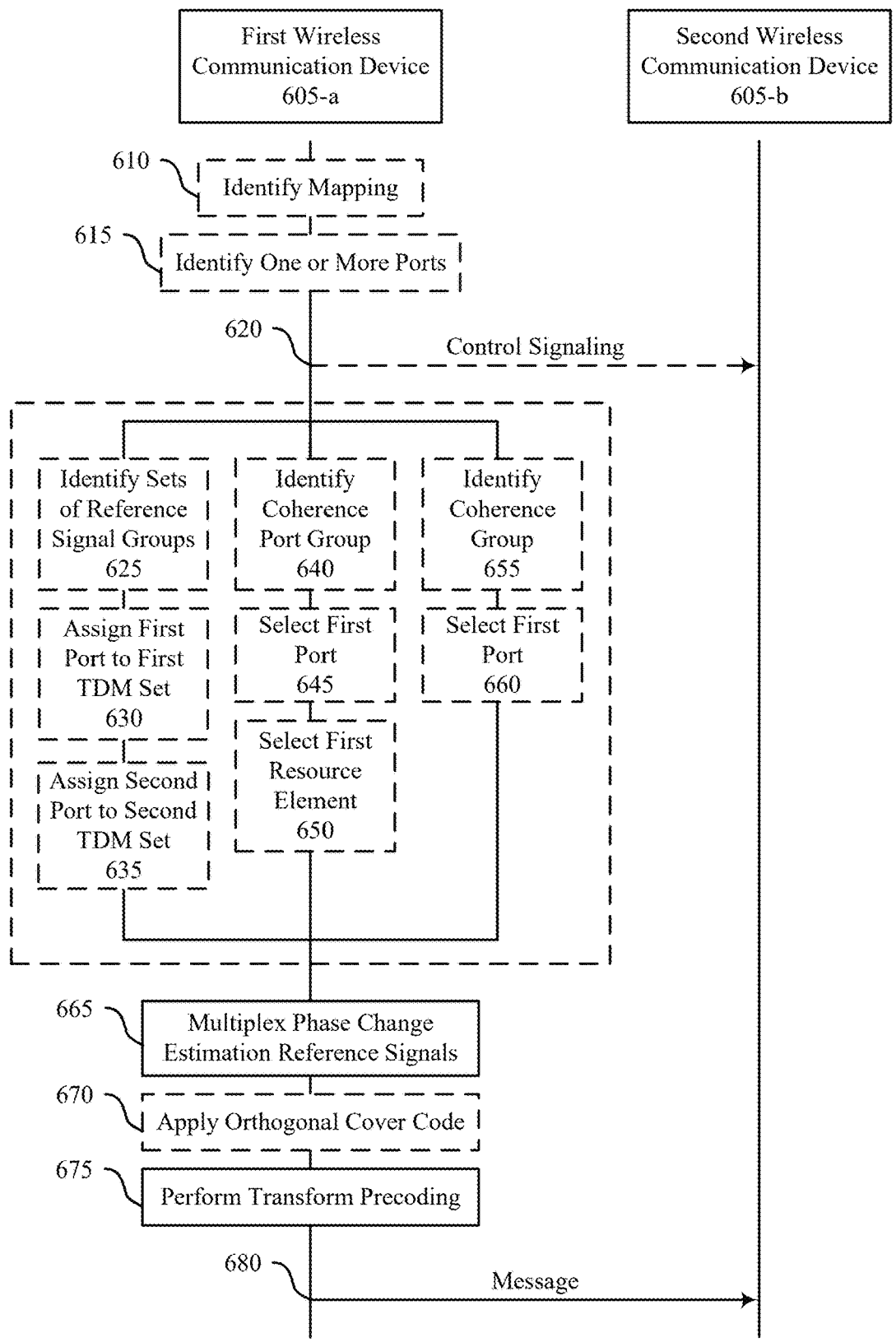
FIG. 6 shows an example of a process flow that supports multiple-port phase change estimation reference signals for DFT-s-OFDM transmissions in accordance with one or more aspects of the present disclosure.

FIG. 6 shows an example of a process flow 600 that supports multiple-port phase change estimation reference signals for DFT-s-OFDM transmissions in accordance with one or more aspects of the present disclosure. The process flow 600 may implement or be implemented by aspects of the wireless communications system 100 and the wireless communications system 200, as described with reference to FIGS. 1 and 2. For example, the process flow 600 illustrates actions performed by a first wireless communication device 605-a and a second wireless communication device 605-b. In the following description of the process flow 600, the operations between the first wireless communication device 605-a and the second wireless communication device 605-b may be performed in a different order than the example shown, or the operations between the first wireless communication device 605-a and the second wireless communication device 605-b may be performed in different orders at different times. Some operations may also be omitted from the process flow 600, and other operations may be added to the process flow 600.

In some examples, the first wireless communication device 605-a may be a transmitting device, and the second wireless communication device 605-b may be a receiving device. In some other examples, the first wireless communication device 605-a may be a receiving device, and the second wireless communication device 605-b may be a transmitting device. For example, the first wireless communication device 605-a may be a UE, and the second wireless communication device 605-b may be a network entity, which may be examples of corresponding devices described herein, including with reference to FIGS. 1-2. Alternatively, the first wireless communication device 605-a may be a network entity, and the second wireless communication device 605-b may be a UE.

In some examples, at least a first set of DMRS ports and a second set of DMRS ports used for transmitting one or more DMRS may be included in one or more CDM groups. At 610, the first wireless communication device 605-a may identify a mapping between the one or more CDM groups and one or more sets of reference signal groups. At least one DMRS port included in a CDM group may be mapped to a set of ports included in a set of reference signal groups of the one or more sets of reference signal groups. In some examples, one or more respective DMRS ports associated with different CDM groups may be mapped to one or more respective ports associated with different TDM sets. The one or more respective ports of the set of ports may be code division multiplexed.

In some examples, at least a first set of DMRS ports and a second set of DMRS ports used for transmitting the one or more DMRS may be included in one or more DMRS coherence groups. At 615, the first wireless communication device 605-a may identify one or more ports of a plurality of ports for transmitting one or more phase change estimation reference signals that map to one or more DMRS ports included in a DMRS coherence group of the one or more DMRS coherence groups.

At 620, the first wireless communication device 605-a may transmit control signaling indicating a mapping between the one or more ports and respective DMRS ports included in the DMRS coherence group. In some examples, the first wireless communication device 605-a may transmit the control signaling to the second wireless communication device 605-b.

In some implementations, the plurality of ports for transmitting the one or more phase change estimation reference signals may be associated with the respective sets of reference signal groups. At 625, the first wireless communication device 605-a may identify the respective sets of reference signal groups. The respective sets of reference signal groups may include at least a second set of reference signal groups and a third set of reference signal groups. In such cases, the second set of reference signal groups corresponds to the first TDM set, and the third set of reference signal groups corresponds to the second TDM set. Each reference signal group included in the respective sets of reference signal groups may include a quantity of resource elements. Additionally, the first TDM set and the second TDM set may be separated by a timing offset value that is greater than or equal to the quantity of resource elements.

At 630, the first wireless communication device 605-a may assign a first port of the plurality of ports to the first TDM set. At 635, the first wireless communication device 605-a may assign a second port of the plurality of ports to the second TDM set. In some examples, the one or more phase change estimation reference signals may be transmitted using the first port and the second port.

In some other implementations, the plurality of ports for transmitting the one or more phase change estimation reference signals may be associated with the respective sets of reference signal groups, In some examples, at least a first DMRS port and a second DMRS port used for transmitting the one or more DMRS may be coherent. At 640, the first wireless communication device 605-a may identify one or more coherence port groups associated with one or more of a set of coherent DMRS ports or a set of ports of the plurality of ports.

At 645, the first wireless communication device 605-*a* may select, from a first coherence port group of the one or more coherence port groups, a first port of the plurality of ports for transmitting the one or more phase change estimation reference signals. In some examples, the first coherence port group may include respective ports associated with a same TDM set. The first port may be used for transmitting the one or more phase change estimation reference signals in accordance with the selection.

At 650, the first wireless communication device 605-*a* may select, for a reference signal group of the respective sets of reference signal groups and prior to performing a transform precoding procedure, a first resource element in the time domain for transmitting the one or more phase change estimation reference signals.

Alternatively, the plurality of ports for transmitting the one or more phase change estimation reference signals may be associated with the respective sets of reference signal groups. In some examples, at least a first DMRS port and a second DMRS port used for transmitting the one or more DMRS are coherent. At 655, the first wireless communication device 605-*a* may identify one or more coherence groups associated with one or more of a set of coherent DMRS ports or a set of coherent ports of the plurality of ports.

At 660, the first wireless communication device 605-*a* may select a first port of the plurality of ports from a first coherence group of the one or more coherence groups. In some examples, the first coherence group may include respective ports associated with a same TDM set. The first port may be used for transmitting the one or more phase change estimation reference signals in accordance with the selection.

At 665, the first wireless communication device 605-*a* may multiplex one or more phase change estimation reference signals with a set of data symbols in a time domain. In some examples, the one or more phase change estimation reference signals may be associated with one or more sets of reference signal groups. Additionally, the plurality of ports for transmitting the one or more phase change estimation reference signals may be associated with an OCC and a first set of reference signal groups of the one or more sets of reference signal groups or may be associated with respective sets of reference signal groups of the one or more sets of reference signal groups. In some examples, the respective sets of reference signal groups may correspond to at least a first TDM set and a second TDM set different from the first TDM set At 670, the first wireless communication device 605-*a* may apply the OCC to the one or more phase change estimation reference signals in the first set of reference signal groups. In some examples, a first value of the OCC corresponds to a first port of the plurality of ports, and a second value of the OCC corresponds to a second port of the plurality of ports. Additionally, the OCC and another OCC associated with a DMRS CDM group have a same size. In some examples, the plurality of ports for transmitting the one or more phase change estimation reference signals may be associated with the OCC and the first set of reference signal groups based on a non-coherence between a first DMRS port and a second DMRS port used for transmitting the one or more DMRS.

At 675, the first wireless communication device 605-*a* may perform transform precoding on the set of data symbols and the one or more phase change estimation reference signals using a DFT.

At 680, the first wireless communication device 605-*a* may transmit a message including the set of data symbols during two or more slots. Each slot of the two or more slots may include the set of data symbols, the one or more phase change estimation reference signals, and one or more DMRS. At least one port of the plurality of ports may be used for transmitting the one or more phase change estimation reference signals. In some examples, the one or more phase change estimation reference signals may be transmitted in accordance with the mapping. The message may include a DFT-s-OFDM waveform based on the transform precoding.

Figure 7:
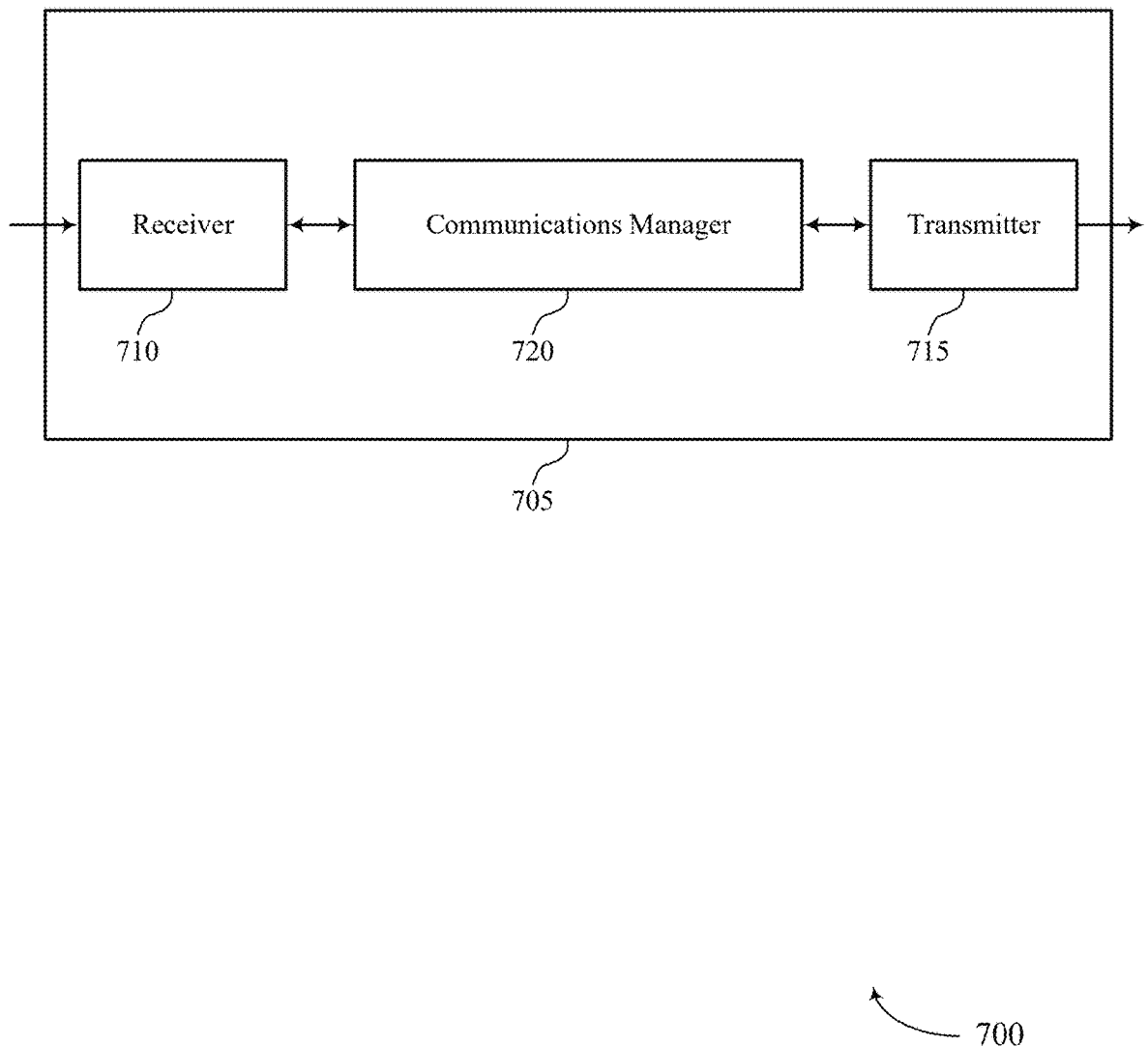
FIGS. 7 and 8 show block diagrams of devices that support multiple-port phase change estimation reference signals for DFT-s-OFDM transmissions in accordance with one or more aspects of the present disclosure.

FIG. 7 shows a block diagram 700 of a device 705 that supports multiple-port phase change estimation reference signals for DFT-s-OFDM transmissions in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to multiple-port phase change estimation reference signals for DFT-s-OFDM transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiple-port phase change estimation reference signals for DFT-s-OFDM transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of multiple-port phase change estimation reference signals for DFT-s-OFDM transmissions as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for multiplexing one or more phase change estimation reference signals with a set of data symbols in a time domain, where the one or more phase change estimation reference signals are associated with one or more sets of reference signal groups, and where a set of multiple ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set. The communications manager 720 is capable of, configured to, or operable to support a means for performing transform precoding on the set of data symbols and the one or more phase change estimation reference signals using a DFT. The communications manager 720 is capable of, configured to, or operable to support a means for transmitting a message including the set of data symbols during two or more slots, where each slot of the two or more slots includes the set of data symbols, the one or more phase change estimation reference signals, and one or more DMRSs, where at least one port of the set of multiple ports is used for transmitting the one or more phase change estimation reference signals, and where the message includes a DFT-spread orthogonal frequency-division multiplexing (DFT-s-OFDM) waveform based on the transform precoding.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced signaling overhead and more efficient utilization of communication resources.

Figure 8:
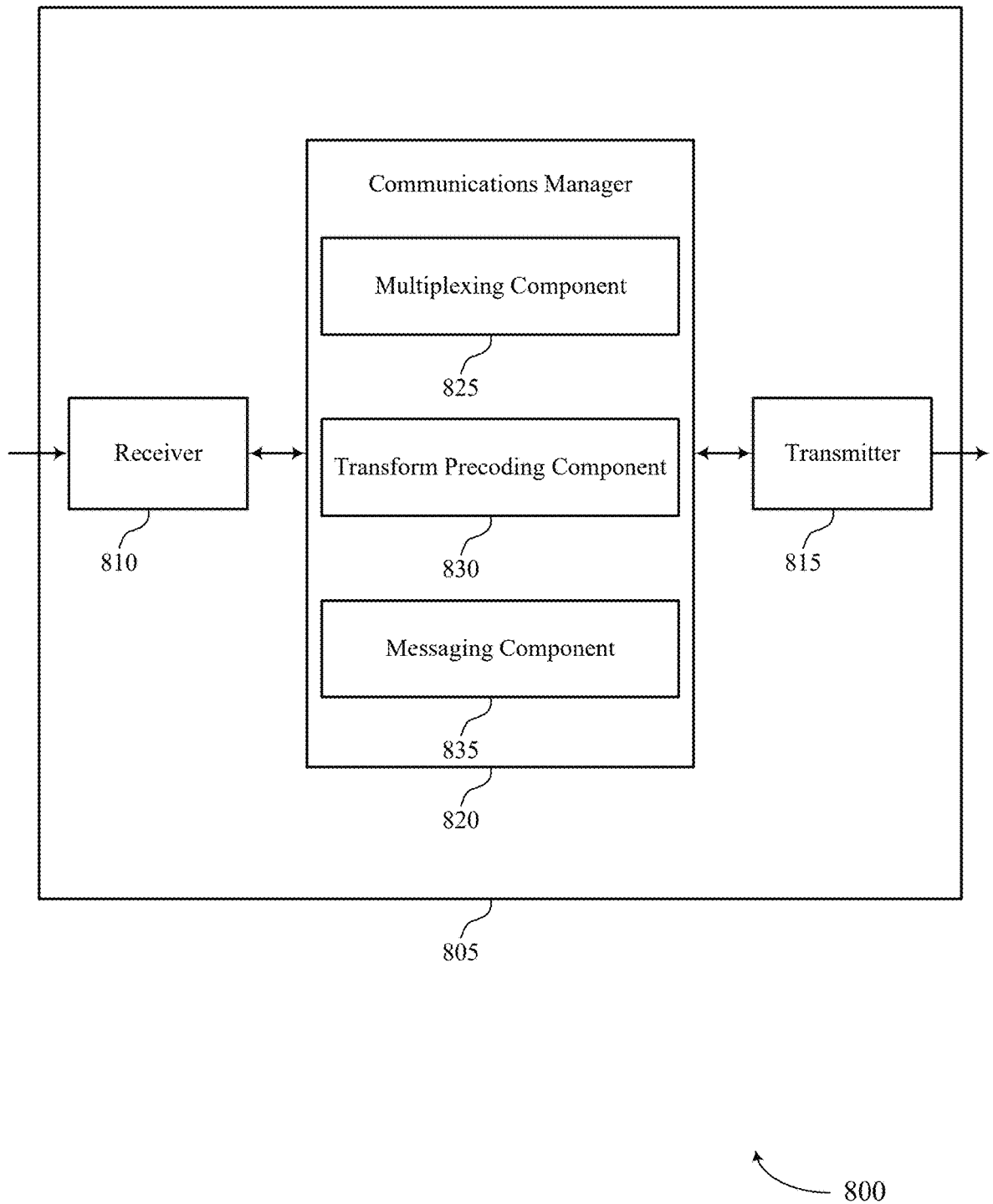

FIG. 8 shows a block diagram 800 of a device 805 that supports multiple-port phase change estimation reference signals for DFT-s-OFDM transmissions in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to multiple-port phase change estimation reference signals for DFT-s-OFDM transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiple-port phase change estimation reference signals for DFT-s-OFDM transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multiple-port phase change estimation reference signals for DFT-s-OFDM transmissions as described herein. For example, the communications manager 820 may include a multiplexing component 825, a transform precoding component 830, a messaging component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The multiplexing component 825 is capable of, configured to, or operable to support a means for multiplexing one or more phase change estimation reference signals with a set of data symbols in a time domain, where the one or more phase change estimation reference signals are associated with one or more sets of reference signal groups, and where a set of multiple ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set. The transform precoding component 830 is capable of, configured to, or operable to support a means for performing transform precoding on the set of data symbols and the one or more phase change estimation reference signals using a DFT. The messaging component 835 is capable of, configured to, or operable to support a means for transmitting a message including the set of data symbols during two or more slots, where each slot of the two or more slots includes the set of data symbols, the one or more phase change estimation reference signals, and one or more DMRSs, where at least one port of the set of multiple ports is used for transmitting the one or more phase change estimation reference signals, and where the message includes a DFT-spread orthogonal frequency-division multiplexing (DFT-s-OFDM) waveform based on the transform precoding.

Figure 9:
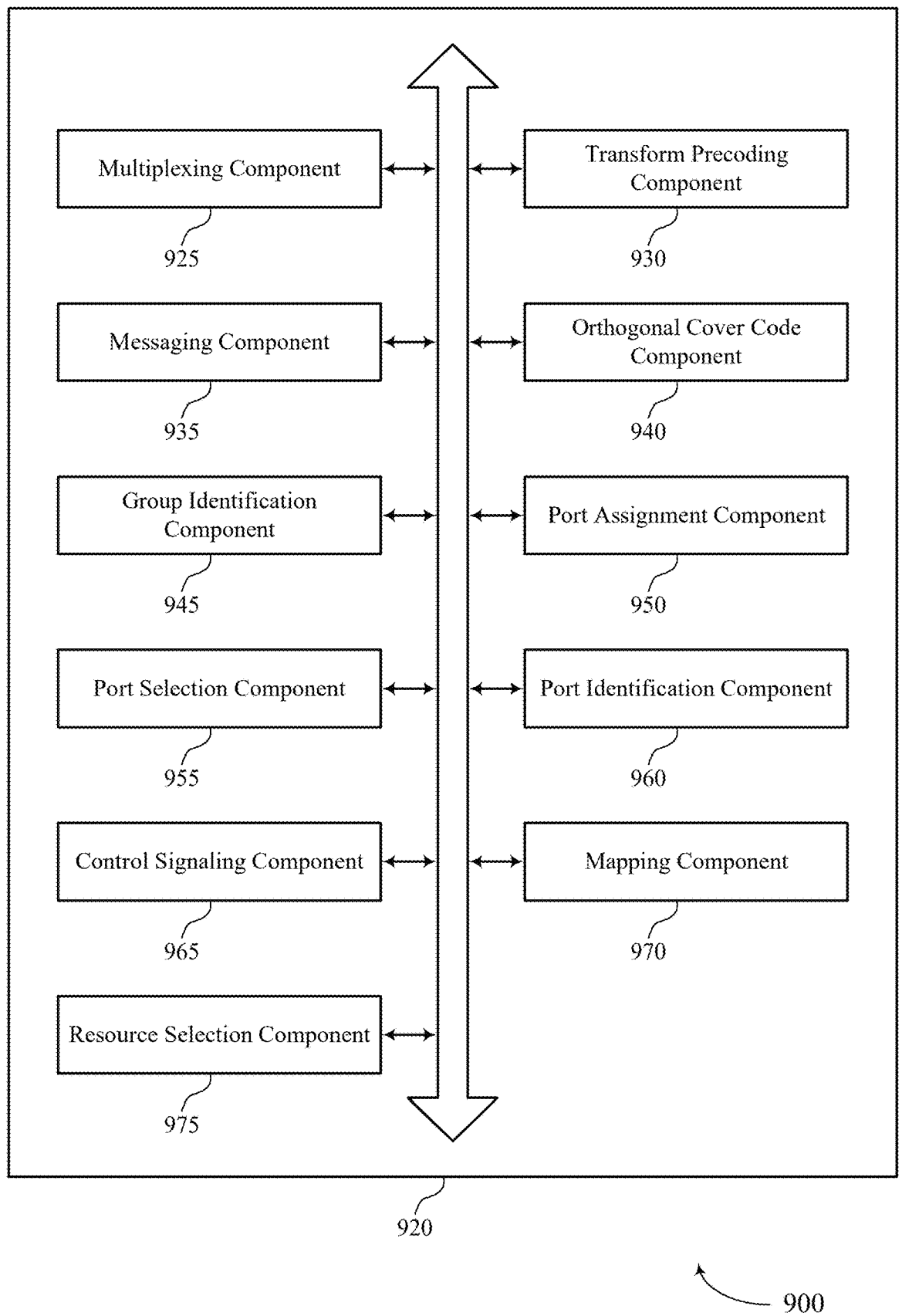
FIG. 9 shows a block diagram of a communications manager that supports multiple-port phase change estimation reference signals for DFT-s-OFDM transmissions in accordance with one or more aspects of the present disclosure.

FIG. 9 shows a block diagram 900 of a communications manager 920 that supports multiple-port phase change estimation reference signals for DFT-s-OFDM transmissions in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multiple-port phase change estimation reference signals for DFT-s-OFDM transmissions as described herein. For example, the communications manager 920 may include a multiplexing component 925, a transform precoding component 930, a messaging component 935, an OCC component 940, a group identification component 945, a port assignment component 950, a port selection component 955, a port identification component 960, a control signaling component 965, a mapping component 970, a resource selection component 975, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The multiplexing component 925 is capable of, configured to, or operable to support a means for multiplexing one or more phase change estimation reference signals with a set of data symbols in a time domain, where the one or more phase change estimation reference signals are associated with one or more sets of reference signal groups, and where a set of multiple ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set. The transform precoding component 930 is capable of, configured to, or operable to support a means for performing transform precoding on the set of data symbols and the one or more phase change estimation reference signals using a DFT. The messaging component 935 is capable of, configured to, or operable to support a means for transmitting a message including the set of data symbols during two or more slots, where each slot of the two or more slots includes the set of data symbols, the one or more phase change estimation reference signals, and one or more DMRSs, where at least one port of the set of multiple ports is used for transmitting the one or more phase change estimation reference signals, and where the message includes a DFT-spread orthogonal frequency-division multiplexing (DFT-s-OFDM) waveform based on the transform precoding.

In some examples, the set of multiple ports for transmitting the one or more phase change estimation reference signals are associated with the OCC and the first set of reference signal groups, and the OCC component 940 is capable of, configured to, or operable to support a means for applying the OCC to the one or more phase change estimation reference signals in the first set of reference signal groups, where a first value of the OCC corresponds to a first port of the set of multiple ports, and where a second value of the OCC corresponds to a second port of the set of multiple ports.

In some examples, the set of multiple ports for transmitting the one or more phase change estimation reference signals are associated with the OCC and the first set of reference signal groups based on a non-coherence between a first DMRS port and a second DMRS port used for transmitting the one or more DMRSs.

In some examples, the set of multiple ports for transmitting the one or more phase change estimation reference signals are associated with the respective sets of reference signal groups, and the group identification component 945 is capable of, configured to, or operable to support a means for identifying the respective sets of reference signal groups, the respective sets of reference signal groups including at least a second set of reference signal groups and a third set of reference signal groups, where the second set of reference signal groups corresponds to the first TDM set, and the third set of reference signal groups corresponds to the second TDM set. In some examples, the set of multiple ports for transmitting the one or more phase change estimation reference signals are associated with the respective sets of reference signal groups, and the port assignment component 950 is capable of, configured to, or operable to support a means for assigning a first port of the set of multiple ports to the first TDM set. In some examples, the set of multiple ports for transmitting the one or more phase change estimation reference signals are associated with the respective sets of reference signal groups, and the port assignment component 950 is capable of, configured to, or operable to support a means for assigning a second port of the set of multiple ports to the second TDM set, where the one or more phase change estimation reference signals are transmitted using the first port and the second port.

In some examples, each reference signal group included in the respective sets of reference signal groups include a quantity of resource elements. In some examples, the first TDM set and the second TDM set are separated by a timing offset value that is greater than or equal to the quantity of resource elements.

In some examples, the set of multiple ports for transmitting the one or more phase change estimation reference signals are associated with the respective sets of reference signal groups of the one or more sets of reference signal groups based on a non-coherence between at least a first DMRS port and a second DMRS port used for transmitting the one or more DMRSs.

In some examples, the set of multiple ports for transmitting the one or more phase change estimation reference signals are associated with the respective sets of reference signal groups, and the group identification component 945 is capable of, configured to, or operable to support a means for identifying one or more coherence port groups associated with one or more of a set of coherent DMRS ports or a set of ports of the set of multiple ports. In some examples, the set of multiple ports for transmitting the one or more phase change estimation reference signals are associated with the respective sets of reference signal groups, and the port selection component 955 is capable of, configured to, or operable to support a means for selecting, from a first coherence port group of the one or more coherence port groups, a first port of the set of multiple ports for transmitting the one or more phase change estimation reference signals, where the first coherence port group includes respective ports associated with a same TDM set, and where the first port is used for transmitting the one or more phase change estimation reference signals in accordance with the selection.

In some examples, the resource selection component 975 is capable of, configured to, or operable to support a means for selecting, for a reference signal group of the respective sets of reference signal groups and prior to performing the transform precoding, a first resource element in the time domain for transmitting the one or more phase change estimation reference signals.

In some examples, the set of multiple ports for transmitting the one or more phase change estimation reference signals are associated with the respective sets of reference signal groups, and the group identification component 945 is capable of, configured to, or operable to support a means for identifying one or more coherence groups associated with one or more of a set of coherent DMRS ports or a set of coherent ports of the set of multiple ports. In some examples, the set of multiple ports for transmitting the one or more phase change estimation reference signals are associated with the respective sets of reference signal groups, and the port selection component 955 is capable of, configured to, or operable to support a means for selecting a first port of the set of multiple ports from a first coherence group of the one or more coherence groups, where the first coherence group includes respective ports associated with a same TDM set, and where the first port is used for transmitting the one or more phase change estimation reference signals in accordance with the selection.

In some examples, at least a first set of DMRS ports and a second set of DMRS ports used for transmitting the one or more DMRSs are included in one or more DMRS coherence groups, and the port identification component 960 is capable of, configured to, or operable to support a means for identifying one or more ports of the set of multiple ports that map to one or more DMRS ports included in a DMRS coherence group of the one or more DMRS coherence groups. In some examples, at least a first set of DMRS ports and a second set of DMRS ports used for transmitting the one or more DMRSs are included in one or more DMRS coherence groups, and the control signaling component 965 is capable of, configured to, or operable to support a means for transmitting control signaling indicating a mapping between the one or more ports and respective DMRS ports included in the DMRS coherence group.

In some examples, at least a first set of DMRS ports and a second set of DMRS ports used for transmitting the one or more DMRSs are included in one or more CDM groups, and the mapping component 970 is capable of, configured to, or operable to support a means for identifying a mapping between the one or more CDM groups and the one or more sets of reference signal groups, where at least one DMRS port included in a CDM group is mapped to a set of ports included in a set of reference signal groups of the one or more sets of reference signal groups, and where the one or more phase change estimation reference signals are transmitted in accordance with the mapping.

In some examples, respective DMRS ports associated with different CDM groups are mapped to respective ports associated with different TDM sets.

In some examples, the OCC and another OCC associated with a DMRS CDM group have a same size.

In some examples, respective ports of the set of ports are code division multiplexed.

Figure 10:
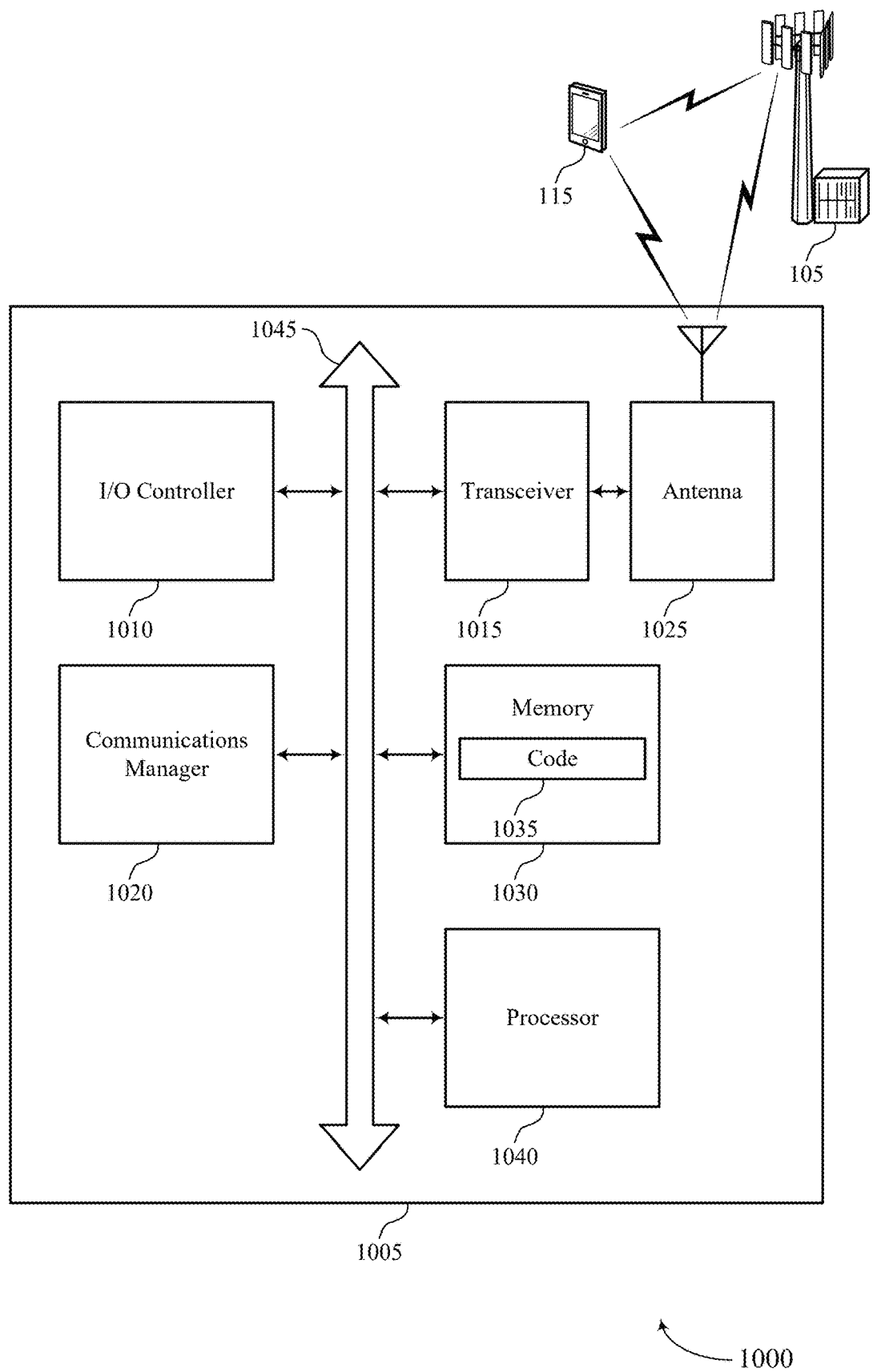
FIG. 10 shows a diagram of a system including a device that supports multiple-port phase change estimation reference signals for DFT-s-OFDM transmissions in accordance with one or more aspects of the present disclosure.

FIG. 10 shows a diagram of a system 1000 including a device 1005 that supports multiple-port phase change estimation reference signals for DFT-s-OFDM transmissions in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting multiple-port phase change estimation reference signals for DFT-s-OFDM transmissions). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for multiplexing one or more phase change estimation reference signals with a set of data symbols in a time domain, where the one or more phase change estimation reference signals are associated with one or more sets of reference signal groups, and where a set of multiple ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set. The communications manager 1020 is capable of, configured to, or operable to support a means for performing transform precoding on the set of data symbols and the one or more phase change estimation reference signals using a DFT. The communications manager 1020 is capable of, configured to, or operable to support a means for transmitting a message including the set of data symbols during two or more slots, where each slot of the two or more slots includes the set of data symbols, the one or more phase change estimation reference signals, and one or more DMRSs, where at least one port of the set of multiple ports is used for transmitting the one or more phase change estimation reference signals, and where the message includes a DFT-spread orthogonal frequency-division multiplexing (DFT-s-OFDM) waveform based on the transform precoding.

By including or configuring the communications manager 1020 in accordance with examples as described herein, the device 1005 may support techniques for reduced latency and improved user experience related to reduced signaling overhead and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of multiple-port phase change estimation reference signals for DFT-s-OFDM transmissions as described herein, or the at least one processor 1040 and the at least one memory 1030 may be otherwise configured to, individually or collectively, perform or support such operations.

Figure 11:
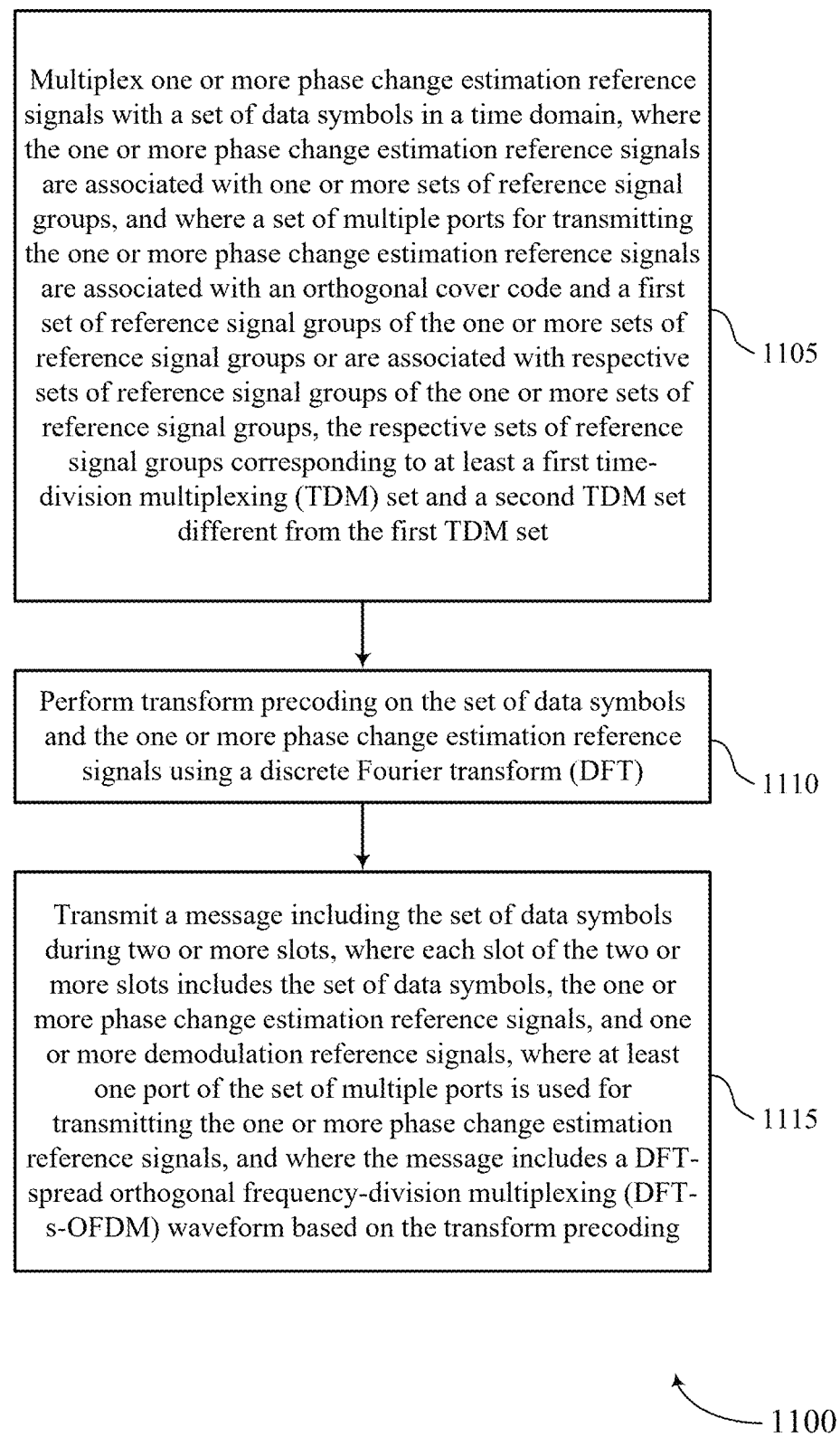
FIG. 11 shows a flowchart illustrating methods that support multiple-port phase change estimation reference signals for DFT-s-OFDM transmissions in accordance with one or more aspects of the present disclosure.

FIG. 11 shows a flowchart illustrating a method 1100 that supports multiple-port phase change estimation reference signals for DFT-s-OFDM transmissions in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include multiplexing one or more phase change estimation reference signals with a set of data symbols in a time domain, where the one or more phase change estimation reference signals are associated with one or more sets of reference signal groups, and where a set of multiple ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set. The operations of 1105 may be performed in accordance with examples as disclosed herein. In some examples, aspects of the operations of 1105 may be performed by a multiplexing component 925 as described with reference to FIG. 9.

At 1110, the method may include performing transform precoding on the set of data symbols and the one or more phase change estimation reference signals using a DFT. The operations of 1110 may be performed in accordance with examples as disclosed herein. In some examples, aspects of the operations of 1110 may be performed by a transform precoding component 930 as described with reference to FIG. 9.

At 1115, the method may include transmitting a message including the set of data symbols during two or more slots, where each slot of the two or more slots includes the set of data symbols, the one or more phase change estimation reference signals, and one or more DMRSs, where at least one port of the set of multiple ports is used for transmitting the one or more phase change estimation reference signals, and where the message includes a DFT-spread orthogonal frequency-division multiplexing (DFT-s-OFDM) waveform based on the transform precoding. The operations of 1115 may be performed in accordance with examples as disclosed herein. In some examples, aspects of the operations of 1115 may be performed by a messaging component 935 as described with reference to FIG. 9.

The following provides an overview of aspects of the present disclosure:

Aspect 1: A method for wireless communications, comprising: multiplexing one or more phase change estimation reference signals with a set of data symbols in a time domain, wherein the one or more phase change estimation reference signals are associated with one or more sets of reference signal groups, and wherein a plurality of ports for transmitting the one or more phase change estimation reference signals are associated with an OCC and a first set of reference signal groups of the one or more sets of reference signal groups or are associated with respective sets of reference signal groups of the one or more sets of reference signal groups, the respective sets of reference signal groups corresponding to at least a first TDM set and a second TDM set different from the first TDM set; performing transform precoding on the set of data symbols and the one or more phase change estimation reference signals using a DFT; and transmitting a message comprising the set of data symbols during two or more slots, wherein each slot of the two or more slots comprises the set of data symbols, the one or more phase change estimation reference signals, and one or more DMRSs, wherein at least one port of the plurality of ports is used for transmitting the one or more phase change estimation reference signals, and wherein the message comprises a DFT-s-OFDM waveform based at least in part on the transform precoding.

Aspect 2: The method of aspect 1, wherein the plurality of ports for transmitting the one or more phase change estimation reference signals are associated with the OCC and the first set of reference signal groups, the method further comprising: applying the OCC to the one or more phase change estimation reference signals in the first set of reference signal groups, wherein a first value of the OCC corresponds to a first port of the plurality of ports, and wherein a second value of the OCC corresponds to a second port of the plurality of ports.

Aspect 3: The method of aspect 2, wherein the plurality of ports for transmitting the one or more phase change estimation reference signals are associated with the OCC and the first set of reference signal groups based at least in part on a non-coherence between a first DMRS port and a second DMRS port used for transmitting the one or more DMRSs.

Aspect 4: The method of aspect 1, wherein the plurality of ports for transmitting the one or more phase change estimation reference signals are associated with the respective sets of reference signal groups, the method further comprising: identifying the respective sets of reference signal groups, the respective sets of reference signal groups comprising at least a second set of reference signal groups and a third set of reference signal groups, wherein the second set of reference signal groups corresponds to the first TDM set, and the third set of reference signal groups corresponds to the second TDM set; and assigning a first port of the plurality of ports to the first TDM set; and assigning a second port of the plurality of ports to the second TDM set, wherein the one or more phase change estimation reference signals are transmitted using the first port and the second port.

Aspect 5: The method of aspect 4, wherein each reference signal group included in the respective sets of reference signal groups comprise a quantity of resource elements, and the first TDM set and the second TDM set are separated by a timing offset value that is greater than or equal to the quantity of resource elements.

Aspect 6: The method of any of aspects 4 through 5, wherein the plurality of ports for transmitting the one or more phase change estimation reference signals are associated with the respective sets of reference signal groups of the one or more sets of reference signal groups based at least in part on a non-coherence between at least a first DMRS port and a second DMRS port used for transmitting the one or more DMRSs.

Aspect 7: The method of aspect 1, wherein the plurality of ports for transmitting the one or more phase change estimation reference signals are associated with the respective sets of reference signal groups, and wherein at least a first DMRS port and a second DMRS port used for transmitting the one or more DMRSs are coherent, the method further comprising: identifying one or more coherence port groups associated with one or more of a set of coherent DMRS ports or a set of ports of the plurality of ports; selecting, from a first coherence port group of the one or more coherence port groups, a first port of the plurality of ports for transmitting the one or more phase change estimation reference signals, wherein the first coherence port group includes respective ports associated with a same TDM set, and wherein the first port is used for transmitting the one or more phase change estimation reference signals in accordance with the selection.

Aspect 8: The method of aspect 7, further comprising: selecting, for a reference signal group of the respective sets of reference signal groups and prior to performing the transform precoding, a first resource element in the time domain for transmitting the one or more phase change estimation reference signals.

Aspect 9: The method of aspect 1, wherein the plurality of ports for transmitting the one or more phase change estimation reference signals are associated with the respective sets of reference signal groups, and wherein at least a first DMRS port and a second DMRS port used for transmitting the one or more DMRSs are coherent, the method further comprising: identifying one or more coherence groups associated with one or more of a set of coherent DMRS ports or a set of coherent ports of the plurality of ports; selecting a first port of the plurality of ports from a first coherence group of the one or more coherence groups, wherein the first coherence group includes respective ports associated with a same TDM set, and wherein the first port is used for transmitting the one or more phase change estimation reference signals in accordance with the selection.

Aspect 10: The method of aspect 1, wherein at least a first set of DMRS ports and a second set of DMRS ports used for transmitting the one or more DMRSs are included in one or more DMRS coherence groups, the method further comprising: identifying one or more ports of the plurality of ports that map to one or more DMRS ports included in a DMRS coherence group of the one or more DMRS coherence groups; and transmitting control signaling indicating a mapping between the one or more ports and respective DMRS ports included in the DMRS coherence group.

Aspect 11: The method of aspect 1, wherein at least a first set of DMRS ports and a second set of DMRS ports used for transmitting the one or more DMRSs are included in one or more CDM groups, the method further comprising: identifying a mapping between the one or more CDM groups and the one or more sets of reference signal groups, wherein at least one DMRS port included in a CDM group is mapped to a set of ports included in a set of reference signal groups of the one or more sets of reference signal groups, and wherein the one or more phase change estimation reference signals are transmitted in accordance with the mapping.

Aspect 12: The method of aspect 11, wherein respective DMRS ports associated with different CDM groups are mapped to respective ports associated with different TDM sets.

Aspect 13: The method of any of aspects 11 through 12, wherein the OCC and another OCC associated with a DMRS CDM group have a same size.

Aspect 14: The method of any of aspects 11 through 13, wherein respective ports of the set of ports are code division multiplexed.

Aspect 15: An apparatus for wireless communications, comprising one or more memories storing processor-executable code, and one or more processors coupled with the one or more memories and individually or collectively operable to execute the code to cause the apparatus to perform a method of any of aspects 1 through 14.

Aspect 16: An apparatus for wireless communications, comprising at least one means for performing a method of any of aspects 1 through 14.

Aspect 17: A non-transitory computer-readable medium storing code for wireless communications, the code comprising instructions executable by one or more processors to perform a method of any of aspects 1 through 14.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless communication device, comprising:
one or more memories storing processor-executable code; and
one or more processors coupled with the one or more memories and individually or collectively operable to execute the code to cause the wireless communication device to:
multiplex one or more phase change estimation reference signals with a set of data symbols in a time domain, wherein the one or more phase change estimation reference signals are associated with one or more sets of reference signal groups, and wherein a plurality of ports for transmitting the one or more phase change estimation reference signals are associated with an orthogonal cover code and a first set of reference signal groups of the one or more sets of reference signal groups or are associated with respective sets of reference signal groups of the one or more sets of reference signal groups, the respective sets of reference signal groups corresponding to at least a first time-division multiplexing (TDM) set and a second TDM set different from the first TDM set;
perform transform precoding on the set of data symbols and the one or more phase change estimation reference signals using a discrete Fourier transform (DFT); and
transmit a message comprising the set of data symbols during two or more slots, wherein each slot of the two or more slots comprises the set of data symbols, the one or more phase change estimation reference signals, and one or more demodulation reference signals, wherein at least one port of the plurality of ports is used for transmitting the one or more phase change estimation reference signals, and wherein the message comprises a DFT-spread orthogonal frequency-division multiplexing (DFT-s-OFDM) waveform based at least in part on the transform precoding.

2. The wireless communication device of claim 1, wherein the plurality of ports for transmitting the one or more phase change estimation reference signals are associated with the orthogonal cover code and the first set of reference signal groups, and the one or more processors are individually or collectively further operable to execute the code to cause the wireless communication device to:

apply the orthogonal cover code to the one or more phase change estimation reference signals in the first set of reference signal groups, wherein a first value of the orthogonal cover code corresponds to a first port of the plurality of ports, and wherein a second value of the orthogonal cover code corresponds to a second port of the plurality of ports.

3. The wireless communication device of claim 2, wherein the plurality of ports for transmitting the one or more phase change estimation reference signals are associated with the orthogonal cover code and the first set of reference signal groups based at least in part on a non-coherence between a first demodulation reference signal port and a second demodulation reference signal port used for transmitting the one or more demodulation reference signals.

4. The wireless communication device of claim 1, wherein the plurality of ports for transmitting the one or more phase change estimation reference signals are associated with the respective sets of reference signal groups, and the one or more processors are individually or collectively further operable to execute the code to cause the wireless communication device to:

identify the respective sets of reference signal groups, the respective sets of reference signal groups comprising at least a second set of reference signal groups and a third set of reference signal groups, wherein the second set of reference signal groups corresponds to the first TDM set, and the third set of reference signal groups corresponds to the second TDM set;

assign a first port of the plurality of ports to the first TDM set; and assign a second port of the plurality of ports to the second TDM set, wherein the one or more phase change estimation reference signals are transmitted using the first port and the second port.

5. The wireless communication device of claim 4, wherein:

each reference signal group included in the respective sets of reference signal groups comprise a quantity of resource elements, and the first TDM set and the second TDM set are separated by a timing offset value that is greater than or equal to the quantity of resource elements.

6. The wireless communication device of claim 4, wherein the plurality of ports for transmitting the one or more phase change estimation reference signals are associated with the respective sets of reference signal groups of the one or more sets of reference signal groups based at least in part on a non-coherence between at least a first demodulation reference signal port and a second demodulation reference signal port used for transmitting the one or more demodulation reference signals.

7. The wireless communication device of claim 1, wherein the plurality of ports for transmitting the one or more phase change estimation reference signals are associated with the respective sets of reference signal groups, and the one or more processors are individually or collectively further operable to execute the code to cause the wireless communication device to:

identify one or more coherence port groups associated with one or more of a set of coherent demodulation reference signal ports or a set of ports of the plurality of ports; and select, from a first coherence port group of the one or more coherence port groups, a first port of the plurality of ports for transmitting the one or more phase change estimation reference signals, wherein the first coherence port group includes respective ports associated with a same TDM set, and wherein the first port is used for transmitting the one or more phase change estimation reference signals in accordance with the selection.

8. The wireless communication device of claim 7, wherein the one or more processors are individually or collectively further operable to execute the code to cause the wireless communication device to:

select, for a reference signal group of the respective sets of reference signal groups and prior to performing the transform precoding, a first resource element in the time domain for transmitting the one or more phase change estimation reference signals.

9. The wireless communication device of claim 1, wherein the plurality of ports for transmitting the one or more phase change estimation reference signals are associated with the respective sets of reference signal groups, and the one or more processors are individually or collectively further operable to execute the code to cause the wireless communication device to:

identify one or more coherence groups associated with one or more of a set of coherent demodulation reference signal ports or a set of coherent ports of the plurality of ports; and select a first port of the plurality of ports from a first coherence group of the one or more coherence groups, wherein the first coherence group includes respective ports associated with a same TDM set, and wherein the first port is used for transmitting the one or more phase change estimation reference signals in accordance with the selection.

10. The wireless communication device of claim 1, wherein at least a first set of demodulation reference signal ports and a second set of demodulation reference signal ports used for transmitting the one or more demodulation reference signals are included in one or more demodulation reference signal coherence groups, and the one or more processors are individually or collectively further operable to execute the code to cause the wireless communication device to:

identify one or more ports of the plurality of ports that map to one or more demodulation reference signal ports included in a demodulation reference signal coherence group of the one or more demodulation reference signal coherence groups; and transmit control signaling indicating a mapping between the one or more ports and respective demodulation reference signal ports included in the demodulation reference signal coherence group.

11. The wireless communication device of claim 1, wherein at least a first set of demodulation reference signal ports and a second set of demodulation reference signal ports used for transmitting the one or more demodulation reference signals are included in one or more code division multiplexing (CDM) groups, and the one or more processors are individually or collectively further operable to execute the code to cause the wireless communication device to:
identify a mapping between the one or more CDM groups and the one or more sets of reference signal groups, wherein at least one demodulation reference signal port included in a CDM group is mapped to a set of ports included in a set of reference signal groups of the one or more sets of reference signal groups, and wherein the one or more phase change estimation reference signals are transmitted in accordance with the mapping.

12. The wireless communication device of claim 11, wherein:
respective demodulation reference signal ports associated with different CDM groups are mapped to respective ports associated with different TDM sets.

13. The wireless communication device of claim 11, wherein the orthogonal cover code and another orthogonal cover code associated with a demodulation reference signal CDM group have a same size.

14. The wireless communication device of claim 11, wherein:
respective ports of the set of ports are code division multiplexed.

15. A method for wireless communications, comprising:
multiplexing one or more phase change estimation reference signals with a set of data symbols in a time domain, wherein the one or more phase change estimation reference signals are associated with one or more sets of reference signal groups, and wherein a plurality of ports for transmitting the one or more phase change estimation reference signals are associated with an orthogonal cover code and a first set of reference signal groups of the one or more sets of reference signal groups or are associated with respective sets of reference signal groups of the one or more sets of reference signal groups, the respective sets of reference signal groups corresponding to at least a first time-division multiplexing (TDM) set and a second TDM set different from the first TDM set;
performing transform precoding on the set of data symbols and the one or more phase change estimation reference signals using a discrete Fourier transform (DFT); and
transmitting a message comprising the set of data symbols during two or more slots, wherein each slot of the two or more slots comprises the set of data symbols, the one or more phase change estimation reference signals, and one or more demodulation reference signals, wherein at least one port of the plurality of ports is used for transmitting the one or more phase change estimation reference signals, and wherein the message comprises a DFT-spread orthogonal frequency-division multiplexing (DFT-s-OFDM) waveform based at least in part on the transform precoding.

16. The method of claim 15, wherein the plurality of ports for transmitting the one or more phase change estimation reference signals are associated with the orthogonal cover code and the first set of reference signal groups, the method further comprising:
applying the orthogonal cover code to the one or more phase change estimation reference signals in the first set of reference signal groups, wherein a first value of the orthogonal cover code corresponds to a first port of the plurality of ports, and wherein a second value of the orthogonal cover code corresponds to a second port of the plurality of ports.

17. The method of claim 16, wherein the plurality of ports for transmitting the one or more phase change estimation reference signals are associated with the orthogonal cover code and the first set of reference signal groups based at least in part on a non-coherence between a first demodulation reference signal port and a second demodulation reference signal port used for transmitting the one or more demodulation reference signals.

18. The method of claim 15, wherein the plurality of ports for transmitting the one or more phase change estimation reference signals are associated with the respective sets of reference signal groups, the method further comprising:
identifying the respective sets of reference signal groups, the respective sets of reference signal groups comprising at least a second set of reference signal groups and a third set of reference signal groups, wherein the second set of reference signal groups corresponds to the first TDM set, and the third set of reference signal groups corresponds to the second TDM set;
assigning a first port of the plurality of ports to the first TDM set; and
assigning a second port of the plurality of ports to the second TDM set, wherein the one or more phase change estimation reference signals are transmitted using the first port and the second port.

19. The method of claim 18, wherein:
each reference signal group included in the respective sets of reference signal groups comprise a quantity of resource elements, and
the first TDM set and the second TDM set are separated by a timing offset value that is greater than or equal to the quantity of resource elements.

20. The method of claim 18, wherein the plurality of ports for transmitting the one or more phase change estimation reference signals are associated with the respective sets of reference signal groups of the one or more sets of reference signal groups based at least in part on a non-coherence between at least a first demodulation reference signal port and a second demodulation reference signal port used for transmitting the one or more demodulation reference signals.

21. The method of claim 15, wherein the plurality of ports for transmitting the one or more phase change estimation reference signals are associated with the respective sets of reference signal groups, and wherein at least a first demodulation reference signal port and a second demodulation reference signal port used for transmitting the one or more demodulation reference signals are coherent, the method further comprising:
identifying one or more coherence port groups associated with one or more of a set of coherent demodulation reference signal ports or a set of ports of the plurality of ports; and
selecting, from a first coherence port group of the one or more coherence port groups, a first port of the plurality of ports for transmitting the one or more phase change estimation reference signals, wherein the first coherence port group includes respective ports associated with a same TDM set, and wherein the first port is used for transmitting the one or more phase change estimation reference signals in accordance with the selection.

22. The method of claim 21, further comprising:
  selecting, for a reference signal group of the respective sets of reference signal groups and prior to performing the transform precoding, a first resource element in the time domain for transmitting the one or more phase change estimation reference signals.

23. The method of claim 15, wherein the plurality of ports for transmitting the one or more phase change estimation reference signals are associated with the respective sets of reference signal groups, and wherein at least a first demodulation reference signal port and a second demodulation reference signal port used for transmitting the one or more demodulation reference signals are coherent, the method further comprising:
  identifying one or more coherence groups associated with one or more of a set of coherent demodulation reference signal ports or a set of coherent ports of the plurality of ports; and
  selecting a first port of the plurality of ports from a first coherence group of the one or more coherence groups, wherein the first coherence group includes respective ports associated with a same TDM set, and wherein the first port is used for transmitting the one or more phase change estimation reference signals in accordance with the selection.

24. The method of claim 15, wherein at least a first set of demodulation reference signal ports and a second set of demodulation reference signal ports used for transmitting the one or more demodulation reference signals are included in one or more demodulation reference signal coherence groups, the method further comprising:
  identifying one or more ports of the plurality of ports that map to one or more demodulation reference signal ports included in a demodulation reference signal coherence group of the one or more demodulation reference signal coherence groups; and
  transmitting control signaling indicating a mapping between the one or more ports and respective demodulation reference signal ports included in the demodulation reference signal coherence group.

25. The method of claim 15, wherein at least a first set of demodulation reference signal ports and a second set of demodulation reference signal ports used for transmitting the one or more demodulation reference signals are included in one or more code division multiplexing (CDM) groups, the method further comprising:
  identifying a mapping between the one or more CDM groups and the one or more sets of reference signal groups, wherein at least one demodulation reference signal port included in a CDM group is mapped to a set of ports included in a set of reference signal groups of the one or more sets of reference signal groups, and wherein the one or more phase change estimation reference signals are transmitted in accordance with the mapping.

26. The method of claim 25, wherein respective demodulation reference signal ports associated with different CDM groups are mapped to respective ports associated with different TDM sets.

27. The method of claim 25, wherein the orthogonal cover code and another orthogonal cover code associated with a demodulation reference signal CDM group have a same size.

28. The method of claim 25, wherein respective ports of the set of ports are code division multiplexed.

29. A wireless communication device, comprising:
  means for multiplexing one or more phase change estimation reference signals with a set of data symbols in a time domain, wherein the one or more phase change estimation reference signals are associated with one or more sets of reference signal groups, and wherein a plurality of ports for transmitting the one or more phase change estimation reference signals are associated with an orthogonal cover code and a first set of reference signal groups of the one or more sets of reference signal groups or are associated with respective sets of reference signal groups of the one or more sets of reference signal groups, the respective sets of reference signal groups corresponding to at least a first time-division multiplexing (TDM) set and a second TDM set different from the first TDM set;
  means for performing transform precoding on the set of data symbols and the one or more phase change estimation reference signals using a discrete Fourier transform (DFT); and
  means for transmitting a message comprising the set of data symbols during two or more slots, wherein each slot of the two or more slots comprises the set of data symbols, the one or more phase change estimation reference signals, and one or more demodulation reference signals, wherein at least one port of the plurality of ports is used for transmitting the one or more phase change estimation reference signals, and wherein the message comprises a DFT-spread orthogonal frequency-division multiplexing (DFT-s-OFDM) waveform based at least in part on the transform precoding.

30. A non-transitory computer-readable medium storing code for wireless communications, the code comprising instructions executable by one or more processors to:
  multiplex one or more phase change estimation reference signals with a set of data symbols in a time domain, wherein the one or more phase change estimation reference signals are associated with one or more sets of reference signal groups, and wherein a plurality of ports for transmitting the one or more phase change estimation reference signals are associated with an orthogonal cover code and a first set of reference signal groups of the one or more sets of reference signal groups or are associated with respective sets of reference signal groups of the one or more sets of reference signal groups, the respective sets of reference signal groups corresponding to at least a first time-division multiplexing (TDM) set and a second TDM set different from the first TDM set;
  perform transform precoding on the set of data symbols and the one or more phase change estimation reference signals using a discrete Fourier transform (DFT); and
  transmit a message comprising the set of data symbols during two or more slots, wherein each slot of the two or more slots comprises the set of data symbols, the one or more phase change estimation reference signals, and one or more demodulation reference signals, wherein at least one port of the plurality of ports is used for transmitting the one or more phase change estimation reference signals, and wherein the message comprises a DFT-spread orthogonal frequency-division multiplexing (DFT-s-OFDM) waveform based at least in part on the transform precoding.

* * * * *